(12) United States Patent
Li et al.

(10) Patent No.: US 11,265,868 B2
(45) Date of Patent: *Mar. 1, 2022

(54) BANDWIDTH RESOURCE CONFIGURATION METHOD, APPARATUS, AND SYSTEM

(71) Applicant: Huawei Technologies Co., Ltd., Shenzhen (CN)

(72) Inventors: Junchao Li, Shanghai (CN); Hao Tang, Shanghai (CN); Fan Wang, Berkshire (GB); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,054

(22) Filed: May 5, 2020

(65) Prior Publication Data

US 2020/0267704 A1    Aug. 20, 2020

Related U.S. Application Data

(63) Continuation of application No. 16/280,565, filed on Feb. 20, 2019, now Pat. No. 10,660,079, which is a (Continued)

(30) Foreign Application Priority Data

Jun. 16, 2017   (CN) .......................... 201710459800.3

(51) Int. Cl.
*H04W 72/04* (2009.01)
*H04W 48/12* (2009.01)
(Continued)

(52) U.S. Cl.
CPC ............. *H04W 72/042* (2013.01); *H04L 5/00* (2013.01); *H04W 48/12* (2013.01);
(Continued)

(58) Field of Classification Search
CPC ............. H04W 48/12; H04W 72/0453; H04W 72/048; H04W 72/14
See application file for complete search history.

(56) References Cited

U.S. PATENT DOCUMENTS

| 2011/0243094 A1 | 10/2011 | Dayal et al. |
| 2012/0275428 A1 | 11/2012 | Feng et al. |

(Continued)

FOREIGN PATENT DOCUMENTS

| CN | 102239737 A | 11/2011 |
| CN | 102845120 A | 12/2012 |

(Continued)

OTHER PUBLICATIONS

Intel Corporation, "Bandwidth parts configuration and operations", 3GPP TSG RAN WG1 #89 R1-1707420, Hangzhou, China, May 15-19, 2017, 6 pages.

(Continued)

*Primary Examiner* — Shukri Taha
(74) *Attorney, Agent, or Firm* — Slater Matsil, LLP

(57) ABSTRACT

A method includes: communicating, by a base station, first UE specific information of UE with the UE in a UE source operating bandwidth resource; and sending, by the base station, information about a UE target operating bandwidth resource of the UE to the UE in a UE calibration bandwidth resource of the UE, where the UE target operating bandwidth resource is used by the base station to communicate second UE specific information of the UE with the UE, and the UE source operating bandwidth resource is not completely the same as the UE calibration bandwidth resource.

20 Claims, 10 Drawing Sheets

Related U.S. Application Data continuation of application No. PCT/CN2018/091668, filed on Jun. 15, 2018.

(51) Int. Cl.
*H04L 5/00* (2006.01)
*H04W 72/14* (2009.01)

(52) U.S. Cl.
CPC ..... *H04W 72/048* (2013.01); *H04W 72/0446* (2013.01); *H04W 72/0453* (2013.01); *H04W 72/14* (2013.01)

(56) References Cited

U.S. PATENT DOCUMENTS

| | | | |
|---|---|---|---|
| 2013/0201936 | A1 | 8/2013 | Chen et al. |
| 2014/0206356 | A1 | 7/2014 | Xie |
| 2016/0050647 | A1* | 2/2016 | Hwang ................ H04W 16/24 370/329 |
| 2016/0127991 | A1 | 5/2016 | Ang et al. |
| 2016/0302174 | A1 | 10/2016 | Chatterjee et al. |
| 2017/0245094 | A1 | 8/2017 | Wong et al. |
| 2017/0290017 | A1* | 10/2017 | Takeda ................ H04W 72/04 |
| 2018/0077689 | A1 | 3/2018 | Rico Alvarino et al. |
| 2018/0192329 | A1 | 7/2018 | Medapalli et al. |
| 2018/0262307 | A1 | 9/2018 | Shimezawa |

FOREIGN PATENT DOCUMENTS

| | | |
|---|---|---|
| CN | 103220796 A | 7/2013 |
| CN | 105516888 A | 4/2016 |
| CN | 106034153 A | 10/2016 |
| EP | 3570482 A1 | 11/2019 |
| RU | 2407201 C2 | 12/2010 |
| WO | 2013107368 A1 | 7/2013 |
| WO | 2016046628 | 3/2016 |
| WO | 2016047729 A1 | 3/2016 |

OTHER PUBLICATIONS

Panasonic, "On default bandwidth part", 3GPP TSG-RAN WG1 NR Ad-Hoc#2, R1-1710787, Qingdao, PR China, Jun. 27-30, 2017, 6 pages.

3rd Generation Partnership Project; Technical Specification Group Radio Access Network; NR; Physical channels and modulation (Release 15), 3GPP TS 38.211 V0.0.0 (May 2017), 10 pages.

3rd Generation Partnership Project; Technical Specification Group Radio Access Network; NR; Multiplexing and channel coding (Release 15), 3GPP TS 38.212 V0.0.0 (May 2017), 10 pages.

3rd Generation Partnership Project; Technical Specification Group Radio Access Network; NR; Medium Access Control (MAC) protocol specification (Release 15), 3GPP TS 38.321 V0.0.3 (May 2017) May 4, 2017, 20 pages.

Interdigital Inc., "Bandwidth Adaptation in NR," 3GPP TSG RAN WG1 Meeting #89, R1-1708998, Hangzhou, China, May 15-19, 2017, 3 pages.

MCC Support, "Final Report of 3GPP TSG RAN WG1 #88 v1.0.0 (Athens, Greece, Feb. 13-17, 2017)," 3GPP TSG RAN WG1 Meeting #88bis R1-1704172, Spokane, USA, Apr. 3-7, 2017,153 pages.

MCC Support, "Final Report of 3GPP TSG RAN WG1 #88bis v1.0.0 (Spokane, USA, Apr. 3-7, 2017)," 3GPP TSG RAN WG1 Meeting #89 R1-1708890, Hangzhou, China, May 15-19, 2017, 154 pages.

Mediatek Inc., "Efficient Wider Bandwidth Operations for NR", 3GPP TSG RAN WG1 Meeting #89, Hangzhou, China; May 15, 2017-2017051914, May 15-19, 2017, XP051273029, 8 pages.

\* cited by examiner

BANDWIDTH RESOURCE CONFIGURATION METHOD, APPARATUS, AND SYSTEM

CROSS-REFERENCE TO RELATED APPLICATIONS

This application is a continuation of U.S. patent application Ser. No. 16/280,565, filed on Feb. 20, 2019, which is a continuation of International Application No. PCT/CN2018/091668, filed on Jun. 15, 2018, which claims priority to Chinese Patent Application No. 201710459800.3, filed on Jun. 16, 2017. All of the afore-mentioned patent applications are hereby incorporated by reference in their entireties.

TECHNICAL FIELD

This application relates to the field of communications technologies, and in particular, to a bandwidth resource configuration method, an apparatus, and a system.

BACKGROUND

In a wireless communications system, when system bandwidth is greater than bandwidth supported by a UE, a base station may configure a bandwidth resource for the UE. The base station and the UE may consider the configured bandwidth resource as an operating bandwidth resource of the UE for the base station and the UE to communicate UE specific information. The bandwidth resource may be a part of a system resource, and bandwidth of the bandwidth resource may be less than the system bandwidth. When the base station and the UE have inconsistent understandings about the operating bandwidth resource of the UE, normal communication between the base station and the UE may fail.

SUMMARY

This application provides a bandwidth resource configuration method, an apparatus, and a system, and an access method, an apparatus, and a system.

A network device (for example, a base station) sends a downlink transmission to user equipment (UE) in a first bandwidth part, and sends information about a second bandwidth part to the user equipment in one or more third bandwidth parts. The UE receives the information about the second bandwidth part from the network device. The second bandwidth part is a bandwidth part to which the user equipment is to switch. The third bandwidth part is an access bandwidth part, or the third bandwidth part is a bandwidth part of one or more candidate operating bandwidth parts of the user equipment. In the design, the network device and the UE can have consistent understandings about an operating bandwidth resource. When switching between bandwidth parts, the UE may switch to the second bandwidth part based on the information about the second bandwidth part that is indicated by the network device, thereby ensuring communication between the UE and the network device as normal.

According to a first aspect, this application provides a method for bandwidth resource configuration. The method includes communicating, by a network device, first UE specific information with the UE in a UE source operating bandwidth resource. The method also includes sending information about a UE target operating bandwidth resource to the UE in a UE calibration bandwidth resource of the UE. The UE target operating bandwidth resource is used to communicate second UE specific information of the UE with the UE, and some or all frequency resources included in the UE source operating bandwidth resource are not included in the UE calibration bandwidth resource, or some or all frequency resources included in the UE calibration bandwidth resource are not included in the UE source operating bandwidth resource. The information about the UE target operating bandwidth resource is carried by a physical downlink control channel. The network device may further send the information about the UE target operating bandwidth resource to the UE in the UE source operating bandwidth resource. In the method provided in the first aspect, the UE may receive, in the calibration bandwidth resource, the information about the UE target operating bandwidth resource configured by a gNB for the UE, so that the UE can calibrate a configuration of an operating bandwidth resource of the UE. Therefore, a probability that the gNB and the UE have inconsistent understandings about the operating bandwidth resource of the UE can be reduced, or when the gNB and the UE have inconsistent understandings about the operating bandwidth resource of the UE, corresponding calibration can be performed, so that the gNB and the UE can have consistent understandings about the operating bandwidth resource of the UE.

In one embodiment, the method further includes: sending, by the network device, frequency resource location information of a UE candidate operating bandwidth resource to the UE, where the UE target operating bandwidth resource is a subset of the UE candidate operating bandwidth resource(s), and the information about the UE target operating bandwidth resource indicates that the UE target operating bandwidth resource(s) is/are at least one bandwidth resource of the UE candidate operating bandwidth resource(s); or the UE target operating bandwidth resource is a subset of a set including the UE candidate operating bandwidth resource and the UE calibration bandwidth resource, and the information about the UE target operating bandwidth resource indicates that the UE target operating bandwidth resource(s) is/are at least one bandwidth resource in the set. In the design, the UE target operating bandwidth resource may be configured for the UE by a relatively small quantity of information bits, as well as indicating that the UE target operating bandwidth resource(s) is/are at least one of a plurality of bandwidth resources.

In one embodiment, the information about the UE target operating bandwidth resource from the network device to the UE includes frequency resource location information of the UE target operating bandwidth resource. In the design, a resource of a system resource can be flexibly configured as the UE target operating bandwidth resource. A resource is flexibly configured for the UE for communication between the gNB and the UE, so that a resource with relatively good channel quality in the system resource can be configured for the UE, thereby increasing a rate of data transmission between the gNB and the UE. Further, a parameter can be flexibly configured for the UE, to meet a quality of service (QoS) requirement of a service of the UE. Further, a forward compatible communications system can be provided.

In one embodiment, the network device sends the information about the UE target operating bandwidth resource to the UE in the UE calibration bandwidth resource of the UE in a first period, where the first period includes an integer quantity of first time units.

In one embodiment, before sending the information about the UE target operating bandwidth resource to the UE in the UE calibration bandwidth resource of the UE, the network device receives a first request from the UE, where the first request is used to request to send the information about the UE target operating bandwidth resource to the UE.

According to a second aspect, this application provides a method for bandwidth resource configuration. The method includes communicating, by UE, first UE specific information with a network device in a UE source operating bandwidth resource. The method also includes receiving, in a UE calibration bandwidth resource of the UE, information about a UE target operating bandwidth resource from the network device. The UE target operating bandwidth resource is used to communicate second UE specific information of the UE with the network device, and some or all frequency resources included in the UE source operating bandwidth resource are not included in the UE calibration bandwidth resource, or some or all frequency resources included in the UE calibration bandwidth resource are not included in the UE source operating bandwidth resource. The information about the UE target operating bandwidth resource is carried by a physical downlink control channel. The UE may further receive, in the UE source operating bandwidth resource, the information about the UE target operating bandwidth resource from the network device.

In one embodiment, the method further includes: receiving frequency resource location information of a UE candidate operating bandwidth resource from the network device, where the UE target operating bandwidth resource is a subset of the UE candidate operating bandwidth resource(s), and the information about the UE target operating bandwidth resource indicates that the UE target operating bandwidth resource(s) is/are at least one bandwidth resource of the UE candidate operating bandwidth resource(s); or the UE target operating bandwidth resource is a subset of a set including the UE candidate operating bandwidth resource and the UE calibration bandwidth resource, and the information about the UE target operating bandwidth resource indicates that the UE target operating bandwidth resource(s) is/are at least one bandwidth resource in the set.

In one embodiment, the information about the UE target operating bandwidth resource includes frequency resource location information of the UE target operating bandwidth resource.

In one embodiment, the UE receives, in the UE calibration bandwidth resource of the UE in a first period, the information about the UE target operating bandwidth resource from the network device, where the first period includes an integer quantity of first time units. A first timer is started or restarted if the first UE specific information of the UE from network device is received in the UE source operating bandwidth resource. After the first timer expires, the UE receive the information about the UE target operating bandwidth resource from the network device in the UE calibration bandwidth resource of the UE. In the design, if the UE needs to switch from the UE source operating bandwidth resource to the UE calibration bandwidth resource and/or needs to switch from the UE calibration bandwidth resource to the UE target operating bandwidth resource when receiving the information about the UE target operating bandwidth resource, the method can reduce switching of the UE between different bandwidth resources, thereby reducing an introduced switching time, saving a time domain air interface resource for the UE, and increasing a rate of data transmission.

In one embodiment, before receiving, in the UE calibration bandwidth resource of the UE, the information about the UE target operating bandwidth resource from the network device, the UE sends a first request to the network device, where the first request is used to request the network device to send the information about the UE target operating bandwidth resource to the UE. In the design, if the UE needs to switch from the UE source operating bandwidth resource to the UE calibration bandwidth resource and/or needs to switch from the UE calibration bandwidth resource to the UE target operating bandwidth resource when receiving the information about the UE target operating bandwidth resource, the method can reduce switching of the UE between different bandwidth resources, thereby reducing an introduced switching time, saving a time domain air interface resource for the UE, and increasing a rate of data transmission.

In one embodiment, before receiving, in the UE calibration bandwidth resource of the UE, the information about the UE target operating bandwidth resource from the network device, the UE switches from the UE source operating bandwidth resource to the UE calibration bandwidth resource in a first guard period; and/or after receiving, in the UE calibration bandwidth resource of the UE, the information about the UE target operating bandwidth resource from the network device, the UE switches from the UE calibration bandwidth resource to the UE target operating bandwidth resource in a second guard period.

According to a third aspect, this application provides a method for bandwidth resource configuration. The method includes communicating, by a network device, first UE specific information of the UE with the UE in a UE source operating bandwidth resource. The method also includes sending, by the network device, information about a UE target operating bandwidth resource to the UE in the UE source operating bandwidth resource, and considering the UE target operating bandwidth resource as an operating bandwidth resource to communicate second UE specific information of the UE with the UE. The method also includes starting, by the network device, a second timer. The method also includes, during running of the second timer, if the network device receives a feedback from the UE in response to a channel carrying the information about the UE target operating bandwidth resource, stopping the second timer. The method also includes, after the second timer expires, considering, by the network device, the UE source operating bandwidth resource as the operating bandwidth resource of the UE. The information about the UE target operating bandwidth resource is carried by a physical downlink control channel. In the design, by a fallback mechanism of the network device, it can be ensured that the UE and the network device have consistent understandings about the operating bandwidth resource of the UE. If the network device receives no feedback, the network device considers that the UE may fail to receive or fail to correctly receive the information about the UE target operating bandwidth resource, considers that the UE may not use the UE target operating bandwidth resource as the operating bandwidth resource of the UE, and considers that the UE may use the UE source operating bandwidth resource as the operating bandwidth resource of the UE. Therefore, the network device may consider the UE source operating bandwidth resource as the operating bandwidth resource of the UE.

In one embodiment, the method further includes: sending, by the network device, frequency resource location information of a UE candidate operating bandwidth resource to the UE, where the UE target operating bandwidth resource is a subset of the UE candidate operating bandwidth resource, and the information about the UE target operating bandwidth resource indicates that the UE target operating bandwidth resource(s) is/are at least one bandwidth resource of the UE candidate operating bandwidth resource(s); or the UE target operating bandwidth resource is a subset of a set including the UE candidate operating bandwidth resource and the UE source operating bandwidth resource, and the information about the UE target operating bandwidth resource indicates that the UE target operating bandwidth resource(s) is/are at least one bandwidth resource in the set.

In one embodiment, the information about the UE target operating bandwidth resource includes frequency resource location information of the UE target operating bandwidth resource.

According to a fourth aspect, this application provides a method for bandwidth resource configuration. The method includes communicating, by a UE, first UE specific information of the UE with a network device in a UE source operating bandwidth resource. The method also includes receiving, by the UE in the UE source operating bandwidth resource, information about a UE target operating bandwidth resource from the network device, and considering the UE target operating bandwidth resource as an operating bandwidth resource to communicate second UE specific information of the UE with the network device. The method also includes sending, by the UE, a feedback to the network device, where the feedback is a feedback in response to a channel carrying the information about the UE target operating bandwidth resource. The method also includes starting, by the UE, a third timer. The method also includes stopping the third timer if the UE receives, in the UE target operating bandwidth resource, the second UE specific information from the network device. The method also includes, after the third timer expires, considering, by the UE, the UE source operating bandwidth resource as the operating bandwidth resource of the UE. In the design, after the third timer expires, if the UE receives no second UE specific information, the UE considers that the network device may fail to receive or fail to correctly receive the feedback, and the UE considers that the network device may use the UE source bandwidth resource as the operating bandwidth resource of the UE. Therefore, the UE may consider the UE source bandwidth resource as the operating bandwidth resource of the UE, so that the network device and the UE can have consistent understandings about the operating bandwidth resource of the UE.

In one embodiment, the method further includes: receiving, by the UE, frequency resource location information of a UE candidate operating bandwidth resource from the network device, where the UE target operating bandwidth resource is a subset of the UE candidate operating bandwidth resource, and the information about the UE target operating bandwidth resource indicates that the UE target operating bandwidth resource(s) is/are at least one bandwidth resource of the UE candidate operating bandwidth resource(s); or the UE target operating bandwidth resource is a subset of a set including the UE candidate operating bandwidth resource and the UE source operating bandwidth resource, and the information about the UE target operating bandwidth resource indicates that the UE target operating bandwidth resource(s) is/are at least one bandwidth resource in the set.

In one embodiment, the information about the UE target operating bandwidth resource includes frequency resource location information of the UE target operating bandwidth resource.

According to a fifth aspect, this application provides a method for bandwidth resource configuration. The method includes communicating, by UE, first UE specific information of the UE from a network device in a UE source operating bandwidth resource. The method also includes receiving, by the UE in the UE source operating bandwidth resource, information about a UE target operating bandwidth resource from the network device, and considering the UE target operating bandwidth resource as an operating bandwidth resource to communicate second UE specific information of the UE with the network device. The method also includes sending, by the UE, a feedback to the network device, where the feedback is a feedback in response to a channel carrying the information about the UE target operating bandwidth resource. The method also includes sending, by the UE, a second request to the network device. The method also includes considering, by the UE, the UE source operating bandwidth resource as the operating bandwidth resource of the UE if the UE receives, in the UE target operating bandwidth resource, no first response from the network device, where the first response is in response to the second request. The information about the UE target operating bandwidth resource is carried by a physical downlink control channel. In the design, if the UE receives no first response, the UE considers that a gNB may fail to receive or fail to correctly receive the feedback, and the UE considers that the gNB may use the UE source bandwidth resource as the operating bandwidth resource of the UE. Therefore, the UE may consider the UE source bandwidth resource as the operating bandwidth resource of the UE, so that the gNB and the UE can have consistent understandings about the operating bandwidth resource of the UE.

In one embodiment, the method further includes: receiving, by the UE, frequency resource location information of a UE candidate operating bandwidth resource from the network device, where the UE target operating bandwidth resource is a subset of the UE candidate operating bandwidth resource, and the information about the UE target operating bandwidth resource indicates that the UE target operating bandwidth resource(s) is/are at least one bandwidth resource of the UE candidate operating bandwidth resource(s); or the UE target operating bandwidth resource is a subset of a set including the UE candidate operating bandwidth resource and the UE source operating bandwidth resource, and the information about the UE target operating bandwidth resource indicates that the UE target operating bandwidth resource(s) is/are at least one bandwidth resource in the set.

In one embodiment, the information about the UE target operating bandwidth resource includes frequency resource location information of the UE target operating bandwidth resource.

According to a sixth aspect, this application provides a method for accessing. The method includes starting or restarting, by UE, a fourth timer if the UE receives, in an operating bandwidth resource of the UE, third UE specific information from a network device. The method also includes accessing, by the UE, the network device after the fourth timer expires. In the method, based on the timer, if the fourth timer expires in the operating bandwidth resource of the UE, the UE considers that the UE and the network device may have inconsistent understandings about the operating bandwidth resource of the UE, and the UE accesses the network device. After the access, the UE and the network device can have consistent understandings about the operating bandwidth resource of the UE.

In one embodiment, the method further includes: communicating, by the UE, first UE specific information of the UE with the network device in a UE source operating bandwidth resource; receiving, by the UE in the UE source operating bandwidth resource, information about a UE target operating bandwidth resource from the network device, and considering the UE target operating bandwidth resource as the operating bandwidth resource of the UE; and starting the fourth timer, where the UE target operating bandwidth resource is used to communicate the third UE specific information of the UE with the network device. In the method, after the operating bandwidth resource is reconfigured for the UE, if the fourth timer expires in the operating bandwidth resource of the UE, the UE considers that the UE and the network device may have inconsistent understandings about the operating bandwidth resource of the UE, and the UE accesses the network device. After the access, the UE and the network device can have consistent understandings about the operating bandwidth resource of the UE.

According to a seventh aspect, this application provides a method for accessing. The method includes sending, by UE, a third request to a network device. The method also includes accessing the network device if the UE receives, in an operating bandwidth resource of the UE, no second response from the network device, where the second response is in response to the third request. In the method, according to a request feedback mechanism, if no second response is received in the operating bandwidth resource of the UE, the UE considers that the UE and the network device may have inconsistent understandings about the operating bandwidth resource of the UE, and the UE accesses the network device. After the access, the UE and the network device can have consistent understandings about the operating bandwidth resource of the UE.

According to an eighth aspect, this application provides a device. The device can implement a function of the network device in the foregoing method. The function may be implemented in a form of hardware, software, or hardware and software. The hardware or the software includes one or more modules corresponding to the function. For example, the device includes: a processor and a memory. The memory is coupled to the processor, and the processor executes a program instruction stored in the memory. The device may also include a transceiver, where the transceiver is coupled to the processor. The processor utilizes the transceiver to: communicate first UE specific information of the UE with the UE in a UE source operating bandwidth resource; and send information about a UE target operating bandwidth resource to the UE in a UE calibration bandwidth resource of the UE, where the UE target operating bandwidth resource is used to communicate second UE specific information of the UE with the UE, and some or all frequency resources included in the UE source operating bandwidth resource are not included in the UE calibration bandwidth resource, or some or all frequency resources included in the UE calibration bandwidth resource are not included in the UE source operating bandwidth resource.

According to a ninth aspect, this application provides a device. The device can implement a function of the UE in the foregoing method. The function may be implemented in a form of hardware, software, or hardware and software. The hardware or the software includes one or more modules corresponding to the function. For example, the device includes: a processor and a memory, where the memory is coupled to the processor. The processor executes a program instruction stored in the memory. The device may also include a transceiver, where the transceiver is coupled to the processor. The processor utilizes the transceiver to: communicate first UE specific information of the UE with a network device in a UE source operating bandwidth resource; and receive, in a UE calibration bandwidth resource of the UE, information about a UE target operating bandwidth resource from the network device, where the UE target operating bandwidth resource is used to communicate second UE specific information of the UE with the network device, and some or all frequency resources included in the UE source operating bandwidth resource are not included in the UE calibration bandwidth resource, or some or all frequency resources included in the UE calibration bandwidth resource are not included in the UE source operating bandwidth resource.

According to a tenth aspect, this application provides a system, including the device in the eighth aspect and the device in the ninth aspect.

According to an eleventh aspect, this application provides a chip system. The chip system includes a processor, and may further include a memory, to support a network device in performing a function of the network device in the foregoing method. The chip system may include a chip, or may include a chip and other discrete device(s).

According to a twelfth aspect, this application provides a chip system. The chip system includes a processor, and may further include a memory, to support UE in performing a function of the UE in the foregoing method. The chip system may include a chip, or may include a chip and other discrete device(s).

According to a thirteenth aspect, this application provides a computer program product including an instruction. When the instruction is executed by a computer, the computer performs at least one of the methods described in the first aspect, the designs of the first aspect, the third aspect, and the designs of the third aspect.

According to a fourteenth aspect, this application provides a computer program product including an instruction. When the instruction is executed by a computer, the computer performs at least one of the methods described in the second aspect, the designs of the second aspect, the fourth aspect, the designs of the fourth aspect, the fifth aspect, the designs of the fifth aspect, the sixth aspect, and the seventh aspect.

BRIEF DESCRIPTION OF THE DRAWINGS

To describe technical solutions in embodiments of this application more clearly, the following describes the accompanying drawings required for the embodiments in this application.

DETAILED DESCRIPTION OF ILLUSTRATIVE EMBODIMENTS

Figure 1:
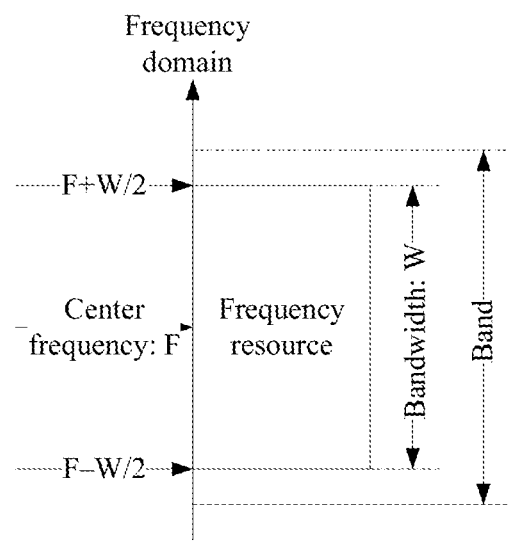
FIG. 1 is a schematic diagram of a frequency resource according to an embodiment of this application.

Network architectures and service scenarios described in the embodiments of this application are intended to describe the technical solutions in the embodiments of this application more clearly, but do not constitute a limitation on the technical solutions provided in the embodiments of this application. As the network architectures evolve and a new service scenario emerges, the technical solutions provided in the embodiments of this application are also applicable to a similar technical problem.

The technical solutions provided in the embodiments of this application may be applied to a wireless communications system, such as a fifth generation mobile communications technology (5G) system, in which a frequency resource can be allocated. The technical solutions provided in the embodiments of this application may be further applied to other orthogonal frequency division multiplexing (OFDM)-based network, for example, a Long Term Evolution (LTE) system. In the embodiments of this application, the terms "system" and "network" are similar in scope.

The wireless communications system includes communications devices. The communications devices include a network device and user equipment (UE), and wireless communication between the communications devices may be performed by an air interface resource. The network device may also be referred to as a network side device. The wireless communication between the communications devices includes: wireless communication between a network device and UE, and wireless communication between network devices. When the wireless communication between the communications devices is performed by the air interface resource, a communications device managing and/or allocating the air interface resource may also be referred to as a scheduling entity, and a scheduled communications device may also be referred to as a subordinate entity. For example, when the network device and the UE perform wireless communication, the network device may also be referred to as a scheduling entity, and the UE may also be referred to as a subordinate entity. In the embodiments of this application, the technical solutions provided in the embodiments of this application may be described by using the wireless communication between the network device and the UE as an example. The technical solutions may be applied to wireless communication between a scheduling entity and a subordinate entity. In the embodiments of this application, the term "wireless communication" may also be referred to as "communication" for short, and the term "communication" may also be described as "data transmission".

The UE in the embodiments of this application includes a handheld device, an in-vehicle device, a wearable device, or a computing device with a wireless communication function. In the embodiments of this application, the UE may also be referred to as a terminal, terminal equipment (TE), or the like. This is not limited in this application.

The network device in the embodiments of this application includes a base station (BS), and the network device may be a device that is deployed in a radio access network and that can perform wireless communication with the UE. The base station may have a plurality of forms, such as a macro base station, a micro base station, a relay station, and an access point. When the macro base station and the micro base station perform wireless communication by a wireless backhaul, the macro base station may also be referred to as a scheduling entity, and the micro base station may also be referred to as a subordinate entity. For example, the base station in the embodiments of this application may be a base station in the 5G system. The base station in the 5G system may also be referred to as a transmission reception point (TRP for) or a generation NodeB (gNB). Alternatively, the base station in the embodiments of this application may be an evolved NodeB (eNB or e-NodeB) in LTE. The technical solutions provided in the embodiments of this application may be described using an example in which the base station is the gNB in the 5G system and the gNB and the UE perform wireless communication. The technical solutions may be applied to wireless communication between a scheduling entity and a subordinate entity. A person skilled in the art may apply the technical solutions provided in the embodiments of this application to wireless communication between other scheduling entity(ies) and other subordinate entity(ies) without creative efforts.

In the wireless communications system, the gNB and the UE may perform wireless communication by an air interface resource. The air interface resource may include a frequency resource, and the frequency resource may fall within a specified frequency range. The frequency range may also be referred to as a band. In frequency domain, a center point of the frequency resource may be referred to as center frequency. A width of the frequency resource may be referred to as bandwidth (BW). For example, FIG. 1 shows a possible schematic structural diagram of a frequency resource. As shown in FIG. 1, the frequency resource may be a resource segment in a band, a bandwidth of the frequency resource is W, a frequency at a center frequency is F, and frequencies at boundary points of the frequency resource are F−W/2 and F+W/2. It may also be described as that, the highest frequency of the frequency resource is F+W/2, and the lowest frequency of the frequency resource is F−W/2.

In the case of wireless communication between the gNB and the UE, the gNB manages a system frequency resource, and allocates a frequency resource in the system frequency resource to the UE, so that the gNB and the UE can perform communication in the allocated frequency resource. The system frequency resource is a frequency resource that the network device can manage and allocate. In the embodiments of this application, the system frequency resource may also be referred to as a "system resource" for short. In the frequency domain, a width of the system frequency resource may be referred to as bandwidth of the system frequency resource, and may also be referred to as system bandwidth or transmission bandwidth. In a communications system, as a UE traffic volume increases, especially as a quantity of UEs increases, a system traffic volume increases significantly. Therefore, in an existing communications system, a design in which system bandwidth is large bandwidth is proposed to provide a relatively high rate of data transmission in the system. In a system with large system bandwidth, in consideration of UE costs and a UE traffic volume, bandwidth supported by the UE may be much less than the system bandwidth. The bandwidth supported by the UE may also be referred to as a bandwidth capability of the UE. As the bandwidth supported by the UE is larger, processing capability of the UE is stronger, a data transmission rate of the UE may be higher, and design costs of the UE may be higher. For example, in the 5G system, maximum system bandwidth may be 400 MHz, and a bandwidth capability of UE may be 20 MHz, 50 MHz, or 100 MHz. In the wireless communications system, bandwidth capabilities of different UEs may be the same or may be different. This is not limited in the embodiments of this application.

When system bandwidth is large bandwidth, a method for allocating, by the gNB, a frequency resource to the UE is as follows. First, the gNB dynamically configures an operating bandwidth resource of the UE for the UE by signaling. The operating bandwidth resource configured for the UE is included in a system frequency resource, and bandwidth of the operating bandwidth resource may be less than or equal to bandwidth supported by the UE. Then, the gNB allocates a frequency resource in the operating bandwidth resource of the UE to the UE, so that the gNB and the UE can perform wireless communication in the allocated frequency resource.

In the embodiments of this application, a bandwidth resource is included in a system frequency resource, and may be all or some consecutive or inconsecutive resources of the system frequency resource. The bandwidth resource may also be referred to as a bandwidth part, a frequency resource, a frequency resource part, a part of a frequency resource, or other names. This is not limited in this application. When the bandwidth resource is a segment of consecutive resources in the system frequency resource, the bandwidth resource may also be referred to as a subband, a narrowband, or other names. This is not limited in this application. In an OFDM-based system, a corresponding parameter may be configured for a bandwidth resource. The parameter includes at least one of a subcarrier spacing or a cyclic prefix (CP). When the third Generation Partnership Project (3GPP) researches and develops standards for the wireless communications system, an English name of the parameter may also be referred to as numerology. Parameter values of different bandwidth resources may be the same or may be different. This is not limited in this application.

In the embodiments of this application, the operating bandwidth resource of the UE may also be described as a bandwidth resource for UE specific information transmission between the gNB and the UE. The UE specific information includes at least one of UE specific downlink control information (DCI), UE specific uplink control information (UCI), UE specific information carried by a data channel, or a UE specific reference signal. The UE specific information transmission between the gNB and the UE includes: at least one of sending UE specific information from the gNB to the UE, receiving, by the gNB, UE specific information from UE, receiving, by the UE, UE specific information from gNB, or sending UE specific information from the UE to the gNB. For example, the UE may receive a PDCCH from the gNB in a specific search space, to receive DCI carried by the PDCCH. Further, the operating bandwidth resource of the UE may also be referred to as an operating bandwidth resource, a UE operating bandwidth resource, a bandwidth resource, or other names. This is not limited in this application. Further, operating bandwidth resources of different UEs may be the same or may be different. This is not limited in this application. For example, an operating bandwidth resource can be shared by multiple UEs, or an operating bandwidth resource may be separately configured for each UE.

If the gNB dynamically configures the operating bandwidth resource for the UE by signaling, the gNB and the UE may have inconsistent understandings about the operating bandwidth resource of the UE. Consequently, neither the gNB can receive data from the UE, nor the UE can receive data from the gNB. In other words, the gNB and the UE cannot perform data transmission as normal. The gNB and the UE may have inconsistent understandings about the operating bandwidth resource of the UE in the following scenarios. For example, if the gNB dynamically reconfigures the operating bandwidth resource for the UE by signaling, and the UE is not required to send a feedback in response to the signaling to the gNB, the UE may miss detecting the signaling or incorrectly detect the signaling. In this case, the gNB may consider that the operating bandwidth resource is a UE target operating bandwidth resource, but the UE may consider that the operating bandwidth resource is a UE source operating bandwidth resource. In other words, the gNB and the UE may have inconsistent understandings about the operating bandwidth resource. For another example, if the gNB dynamically reconfigures the operating bandwidth resource for the UE by signaling, and the UE sends a feedback in response to the signaling to the gNB, the gNB may miss detecting the feedback or incorrectly detect the feedback. In this case, the gNB may consider that the operating bandwidth resource is a UE source operating bandwidth resource, but the UE may consider that the operating bandwidth resource is a UE target operating bandwidth resource. In other words, the gNB and the UE may have inconsistent understandings about the operating bandwidth resource.

In the embodiments of this application, when the gNB reconfigures the operating bandwidth resource for the UE, the UE source operating bandwidth resource is an operating bandwidth resource before the reconfiguration. The UE source operating bandwidth resource may also be referred to as a source operating bandwidth resource, a source operating bandwidth resource of the UE, a source bandwidth resource, a first bandwidth resource, or other names. This is not limited in this application. Further, the UE source operating bandwidth resource may be one or more bandwidth resources. It may also be understood that, the gNB may configure one or more operating bandwidth resources for the UE.

In the embodiments of this application, when the gNB reconfigures the operating bandwidth resource for the UE, the UE target operating bandwidth resource is an operating bandwidth resource that is reconfigured by the gNB for the UE. After the reconfiguration of the operating bandwidth resource takes effect, the gNB and the UE may consider the UE target operating bandwidth resource as the operating bandwidth resource. The UE target operating bandwidth resource may also be referred to as a target operating bandwidth resource, a target operating bandwidth resource of the UE, a target bandwidth resource, a second bandwidth resource, or other names. This is not limited in this application. Further, the UE target operating bandwidth resource may be one or more bandwidth resources. It may also be understood that, the gNB may configure one or more operating bandwidth resources for the UE during the reconfiguration.

To resolve the foregoing problem that a gNB and UE have inconsistent understandings about a UE operating bandwidth resource, the embodiments of this application provide a plurality of technical solutions, and a corresponding method, apparatus, and system related to each technical solution are separately described below by using an example. The apparatus in this application sometimes may also be referred to as a communication apparatus.

A first technical solution is as follows.

In the first technical solution provided in the embodiments of this application, a UE calibration bandwidth resource is introduced for a gNB sending information about a UE target operating bandwidth resource to UE. Specifically, the gNB communicates first UE specific information with the UE in a UE source operating bandwidth resource. The gNB sends the information about the UE target operating bandwidth resource to the UE in the UE calibration bandwidth resource. The UE target operating bandwidth resource is used by the gNB to communicate second UE specific information with the UE. The UE source operating bandwidth resource is not completely the same as the UE calibration bandwidth resource. In the first technical solution provided in the embodiments of this application, the UE receive, in the calibration bandwidth resource, the information about the UE target operating bandwidth resource configured by the gNB for the UE, so that the UE can calibrate a configuration of an operating bandwidth resource. Therefore, a probability that the gNB and the UE have inconsistent understandings about the operating bandwidth resource of the UE can be reduced, or when the gNB and the UE have inconsistent understandings about the operating bandwidth resource, corresponding calibration can be performed, so that the gNB and the UE can have consistent understandings about the operating bandwidth resource of the UE.

In the first technical solution provided in the embodiments of this application, the UE calibration bandwidth resource is not completely the same as the UE source operating bandwidth resource, and is used by the gNB to send the information about the UE target operating bandwidth resource to the UE. The UE calibration bandwidth resource may also be referred to as a calibration bandwidth resource, a configuration bandwidth resource, a UE configuration bandwidth resource, a third bandwidth resource, or other names. This is not limited in this application. In a possible implementation, the UE calibration bandwidth resource may be a bandwidth resource used by the gNB to send a synchronization signal and/or a broadcast channel to the UE. The UE calibration bandwidth resource can be shared by a plurality of UEs. In such a scenario, the UE calibration bandwidth resource may also be referred to as a common bandwidth resource or other names. This is not limited in this application. In another possible implementation, the UE calibration bandwidth resource may be a bandwidth resource used by the UE to initially access the gNB. The bandwidth resource can be shared by a plurality of UEs. In such a scenario, the UE calibration bandwidth resource may also be referred to as an access bandwidth resource, an initial access bandwidth resource, or other names. This is not limited in this application. The bandwidth resource used by the gNB to send the synchronization signal and/or the broadcast channel to the UE and the bandwidth resource used by the UE to initial access to the gNB may be a same bandwidth resource or different bandwidth resources. This is not limited in this application.

In the first technical solution provided in the embodiments of this application, the gNB may periodically send the information about the UE target operating bandwidth resource to the UE in the UE calibration bandwidth resource. In the method, the UE may periodically receive the information about the UE target operating bandwidth resource in the UE calibration bandwidth resource. The UE periodically calibrates the configuration of the operating bandwidth resource. Alternatively, the UE determines whether the UE needs to perform calibration, and if the UE needs to perform calibration, the UE receives the information about the UE target operating bandwidth resource.

In the first technical solution provided in the embodiments of this application, the gNB may alternatively send, based on a received first request from the UE, the information about the UE target operating bandwidth resource to the UE in the UE calibration bandwidth resource. The first request is used to request the gNB to send the information about the UE target operating bandwidth resource to the UE.

Further, in the first technical solution provided in the embodiments of this application, the gNB may further send the information about the UE target operating bandwidth resource to the UE in the operating bandwidth resource of the UE.

A second technical solution is as follows.

In the second technical solution provided in the embodiments of this application, an operating bandwidth resource fallback mechanism (referred to as a "fallback mechanism" in the following) is introduced.

In the second technical solution provided in the embodiments of this application, the fallback mechanism is introduced on a gNB side. A gNB communicates first UE specific information with the UE in a UE source operating bandwidth resource. The gNB further sends information about a UE target operating bandwidth resource to the UE in the UE source operating bandwidth resource. The UE target operating bandwidth resource is used by the gNB to communicate second UE specific information of the UE with the UE. If the gNB receives no feedback, the gNB considers the UE source operating bandwidth resource of the UE as an operating bandwidth resource of the UE. The feedback is a feedback in response to a channel carrying the information about the UE target operating bandwidth resource. In the method, if the gNB receives no feedback, it indicates that the UE may fail to receive or fail to correctly receive the information about the UE target operating bandwidth resource, and the UE may still consider the UE source operating bandwidth resource as the operating bandwidth resource of the UE. Therefore, the gNB performs a fallback to the UE source operating bandwidth resource, and the gNB considers the UE source operating bandwidth resource as the operating bandwidth resource, thereby ensuring that the UE and the gNB have consistent understandings about the operating bandwidth resource.

In the second technical solution provided in the embodiments of this application, the fallback mechanism may be introduced on a UE side. A UE communicates first UE specific information of the UE with a gNB in a UE source operating bandwidth resource. The UE further receives, in the UE source operating bandwidth resource, information about a UE target operating bandwidth resource from the gNB to the UE, and considers the UE target operating bandwidth resource as an operating bandwidth resource of the UE to communicate second UE specific information of the UE with the UE. The UE sends a feedback to the gNB. The feedback is a feedback in response to a channel carrying the information about the UE target operating bandwidth resource. If the UE receives, in the UE target operating bandwidth resource, no second UE specific information from the gNB, the UE considers the UE source operating bandwidth resource as the operating bandwidth resource of the UE. Alternatively, the UE sends a second request to the gNB, and if the UE receives, in the UE target operating bandwidth resource, no first response from gNB, the UE considers the UE source operating bandwidth resource as the operating bandwidth resource of the UE. In the method, if the UE receives no second UE specific information or receives no first response, it indicates that the gNB may fail to receive or fail to correctly receive the feedback from the UE, and the gNB may still consider the UE source operating bandwidth resource as the operating bandwidth resource of the UE. Therefore, the UE performs a fallback to the UE source operating bandwidth resource, and the UE considers the UE source operating bandwidth resource as the operating bandwidth resource of the UE, thereby ensuring that the UE and the gNB have consistent understandings about the operating bandwidth resource of the UE.

In the first technical solution and the second technical solution that are provided in the embodiments of this application, the information about the UE target operating bandwidth resource that is sent by the gNB to the UE may be either of the following two types of information.

First type of information: The information about the UE target operating bandwidth resource from the gNB to the UE may indicate that the UE target operating bandwidth resource(s) is/are at least one bandwidth resource of UE candidate operating bandwidth resource(s), or may indicate that the UE target operating bandwidth resource(s) is/are at least one bandwidth resource in a set including the UE candidate operating bandwidth resource(s) and the UE calibration bandwidth resource. Resource location information of at least one bandwidth resource of the UE candidate operating bandwidth resource(s) may be configured for the gNB and the UE in a pre-configuration manner, or may be configured for the UE in a manner in which the gNB sends information to the UE.

Second type of information: The information about the UE target operating bandwidth resource from the gNB to the UE includes frequency resource location information of the UE target operating bandwidth resource.

A third technical solution is as follows.

In the third technical solution provided in the embodiments of this application, an access mechanism is introduced. In an operating bandwidth resource of UE, if the UE determines that the UE and a gNB may have inconsistent understandings about the operating bandwidth resource of the UE, the UE accesses the gNB. In the method, the UE accesses the gNB, so that communication between the UE and the gNB as normal can be restored.

Based on the foregoing described three technical solutions provided in the embodiments of this application, methods, apparatuses, and systems that are related to the three technical solutions are further described below in detail with reference to the accompanying drawings.

Figure 2:
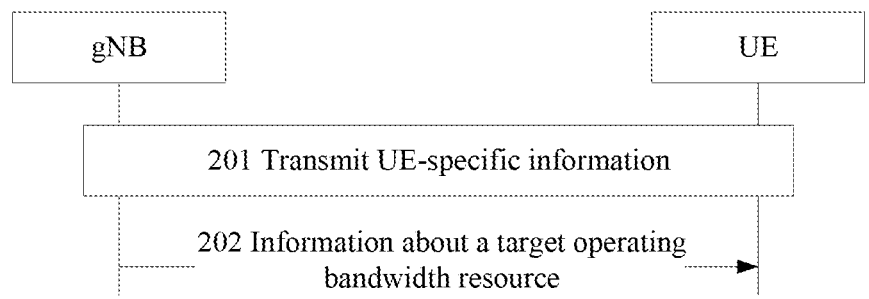
FIG. 2 is a schematic diagram of a first bandwidth resource configuration method according to an embodiment of this application.

FIG. 2 shows a first method for bandwidth resource configuration according to an embodiment of this application. The method corresponds to the first technical solution provided in the embodiments of this application.

Step 201: A gNB communicates first UE specific information of UE with the UE in a UE source operating bandwidth resource.

Step 202: In a UE calibration bandwidth resource of the UE, the gNB sends information about a UE target operating bandwidth resource to the UE, and the UE receives the information about the UE target operating bandwidth resource from the gNB. The UE target operating bandwidth resource is used by the gNB to communicate second UE specific information of the UE with the UE. The UE source operating bandwidth resource is not totally the same as the UE calibration bandwidth resource.

The gNB sends the information about the UE target operating bandwidth resource of the UE to the UE by signaling. The signaling is dynamic signaling, and may be carried by a physical downlink control channel (PDCCH). When the gNB sends the PDCCH, a cyclic redundancy code (CRC) of information carried by the PDCCH may be scrambled by a corresponding radio network temporary identifier (RNTI) for error detection on transmission of the PDCCH. The UE receives the PDCCH, and decodes the control channel based on the corresponding RNTI, to obtain the information carried by the PDCCH. If the information about the UE target operating bandwidth resource from the gNB to the UE is UE specific information, and the information about the UE target operating bandwidth resource is carried by the PDCCH, the gNB may scramble, by using a UE specific RNTI, the CRC of the information carried by the PDCCH. The UE specific RNTI may be a cell RNTI (C-RNTI). If the information about the UE target operating bandwidth resource from the gNB to the UE is shared by a plurality of UEs, and the information about the UE target operating bandwidth resource is carried by the PDCCH, the gNB may scramble, using a common RNTI, the CRC of the information carried by the PDCCH. The plurality of UEs may be all or some UEs in a cell.

In the embodiments of this application, the signaling includes semi-static signaling and dynamic signaling. The semi-static signaling include at least one of radio resource control (RRC) signaling, a broadcast message, a system message, or a media access control (MAC) control element (CE). The dynamic signaling include at least one of signaling carried by a physical downlink control channel or signaling carried by a physical downlink data channel. The signaling carried by the physical downlink control channel (PDCCH) may be referred to as downlink control information (DCI).

That the UE source operating bandwidth resource is not totally the same as the UE calibration bandwidth resource may also be described as follows. Some or all frequency resources included in the UE source operating bandwidth resource are not included in the UE calibration bandwidth resource, or some or all frequency resources included in the UE calibration bandwidth resource are not included in the UE source operating bandwidth resource. For example, in an OFDM-based communications system, that the UE source operating bandwidth resource is not totally the same as the UE calibration bandwidth resource may be as follows: At least one subcarrier included in the UE source operating bandwidth resource is not included in the UE calibration bandwidth resource, or at least one subcarrier included in the UE calibration bandwidth resource is not included in the UE source operating bandwidth resource.

Figure 3:
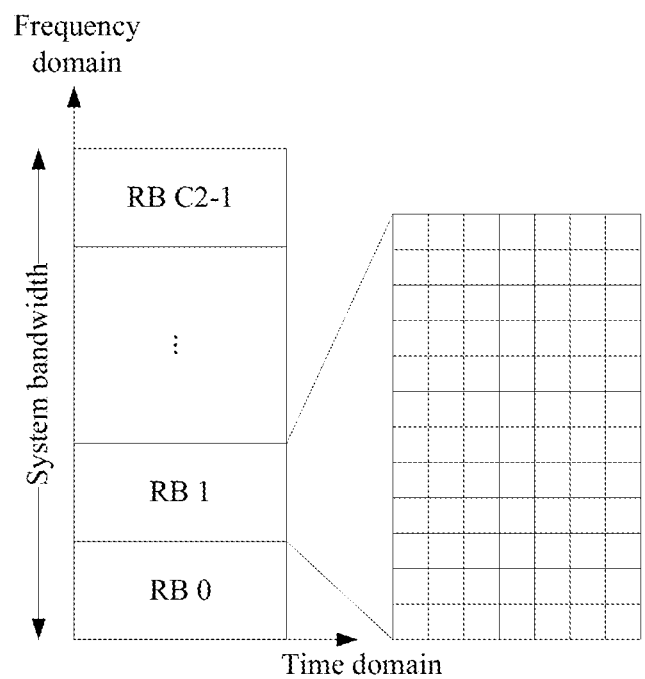
FIG. 3 is a possible schematic structural diagram of system bandwidth according to an embodiment of this application.

The gNB and the UE may determine frequency resource location information of the UE calibration bandwidth resource in a preconfiguration manner. Alternatively, the gNB may configure the UE calibration bandwidth resource for the UE in a signaling configuration manner. The gNB sends signaling to the UE, and the signaling indicates the frequency resource location information of the UE calibration bandwidth resource. Correspondingly, the UE receives the signaling from the gNB, to determine the frequency resource location information of the UE calibration bandwidth resource. For a bandwidth resource, for example, the UE calibration bandwidth resource, frequency resource location information of the bandwidth resource may be any one of the following a first type of frequency resource location information to a fifth type of frequency resource location information:

The first type of frequency resource location information includes a bitmap used to configure resource blocks (RB) or resource block groups (RBG) that are in system bandwidth and that are included in the bandwidth resource. In the embodiments of this application, the RB and the RBG are resource units in the OFDM-based communications system. In the OFDM-based communications system, in frequency domain, a system resource includes several resource grids, one resource grid corresponds to one subcarrier, and one RB includes C1 resource grids. C1 is an integer greater than 1, and for example, C1 is 12. The system bandwidth may be described as C2 RBs. C2 is an integer greater than or equal to 1. Further, in time domain, one RB may include C3 symbols. C3 is an integer greater than 1, and for example, C3 is 7 or 14. For example, one RB includes 12 resource grids in frequency domain, and includes seven symbols in time domain. FIG. 3 is a possible schematic structural diagram of system bandwidth. As shown in FIG. 3, the system bandwidth includes a total of C2 RBs: an RB 0 to an RB C2-1. In frequency domain, the system bandwidth may also be described as C4 RBGs. One RBG includes C5 RBs. C4 and C5 are integers greater than 1. For the first type of frequency resource location information, any RB or RBG included in the bandwidth resource may be selected by using values of bits in the bitmap. Therefore, a flexible resource configuration may be provided, and the first type of frequency resource location information may apply to allocation of consecutive and inconsecutive resources.

A second type of frequency resource location information includes an index of a reference RB and a quantity of consecutively allocated RBs. The reference RB may be any RB in the bandwidth resource. The quantity of consecutively allocated RBs is a width of the bandwidth resource. For example, the reference RB may be an RB with a highest frequency in the bandwidth resource, an RB with a lowest frequency in the bandwidth resource, or a center RB in the bandwidth resource. For the second type of frequency resource location information, joint coding may be performed on indication information of the index of the reference RB and indication information of the quantity of consecutively allocated RBs. Therefore, resource allocation may be performed by a relatively small quantity of information bits, and signaling overheads for resource allocation can be reduced.

A third type of frequency resource location information includes an index of a reference RBG and a quantity of consecutively allocated RBGs. The reference RBG may be any RBG in the bandwidth resource. The quantity of consecutively allocated RBGs is a width of the bandwidth resource. For example, the reference RBG may be an RBG with a highest frequency in the bandwidth resource, an RBG with a lowest frequency in the bandwidth resource, or a center RBG in the bandwidth resource. For the third type of frequency resource location information, joint coding may be performed on indication information of the index of the reference RBG and indication information of the quantity of consecutively allocated RBGs. Therefore, resource allocation may be performed by a relatively small quantity of information bits, and signaling overheads for resource allocation can be reduced.

A fourth type of frequency resource location information includes S combinatorial indexes. S is an integer greater than or equal to 1. One combinatorial index indicates P groups of resource configuration information. Any one of the P groups of resource configuration information includes a start RB index and an end RB index, or includes a start RBG index and an end RBG index. P is an integer greater than or equal to 1. The index may also be referred to as an identifier. A group of resource configuration information indicates a segment of consecutive resources. If the group of resource configuration information includes a start RB index and an end RB index, and the start RB index is the same as the end RB index, the group of resource configuration information indicates one RB, and an index corresponding to the RB is the start RB index or the end RB index. If the group of resource configuration information includes a start RBG index and an end RBG index, and the start RBG index is the same as the end RBG index, the group of resource configuration information indicates one RBG, and an index corresponding to the RBG is the start RBG index or the end RBG index. A sum of resources indicated by each resource configuration information in P groups of resource configuration information indicated by a combinatorial index is a resource indicated by the combinatorial index. A sum of resources indicated by the S combinatorial indexes is a resource corresponding to the bandwidth resource. For the fourth type of frequency resource location information, joint coding may be performed on indication information of the start RB index and indication information of the end RB index. Therefore, resource allocation may be performed by a relatively small amount of information bits, and signaling overheads can be reduced. The fourth type of frequency resource location information may support configuration of consecutive and inconsecutive resources, so that resource configuration can be flexibly performed.

Figure 4:
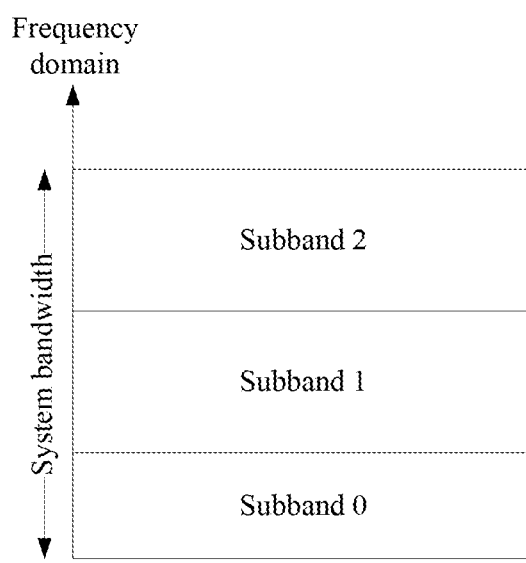
FIG. 4 is a possible schematic structural diagram of a subband included in system bandwidth according to an embodiment of this application.

The fifth type of frequency resource location information includes a subband indication used to indicate that the bandwidth resource is at least one subband of system bandwidth. The system bandwidth includes at least one subband. FIG. 4 is a possible schematic structural diagram of a subband included in the system bandwidth. As shown in FIG. 4, the system bandwidth includes a total of three subbands: subband 0, subband 1, and subband 2. One subband is a part of the system bandwidth. It should be noted that, the system bandwidth may include any quantity of subbands, and FIG. 4 shows only one possibility. Bandwidth of different subbands included in the system bandwidth may be the same or may be different. This is not limited in the embodiments of this application. By the fifth type of resource configuration information, when a bandwidth resource allocated to the UE has a fixed bandwidth size and is consecutive resources, signaling overheads can be effectively reduced.

In the embodiments of this application, the frequency resource location information is used to indicate a location of a resource in frequency domain, and may also be referred to as a frequency resource location configuration, frequency resource configuration information, or other names. This is not limited in this application.

In the first bandwidth resource configuration method, the information about the UE target operating bandwidth resource that is sent by the gNB to the UE may be at least one of the following first and second types of information about the target operating bandwidth resource:

A first type of information about the target operating bandwidth resource is as follows.

In the first bandwidth resource configuration method, the information about the UE target operating bandwidth resource that is sent by the gNB to the UE may indicate that the UE target operating bandwidth resource(s) is/are at least one bandwidth resource of a UE candidate operating bandwidth resource(s), or may indicate that the UE target operating bandwidth resource is at least one bandwidth resource in a set including the UE candidate operating bandwidth resource and the UE calibration bandwidth resource. In this case, the first bandwidth resource configuration method further includes steps as follows. The gNB sends frequency resource location information of the UE candidate operating bandwidth resource to the UE, where the UE target operating bandwidth resource is a subset of the UE candidate operating bandwidth resource, and the information about the UE target operating bandwidth resource indicates that the UE target operating bandwidth resource is at least one bandwidth resource of the UE candidate operating bandwidth resource. The UE candidate operating bandwidth resource may include the UE calibration bandwidth resource. Alternatively, the gNB sends frequency resource location information of the UE candidate operating bandwidth resource to the UE, where the UE target operating bandwidth resource is a subset of the set including the UE candidate operating bandwidth resource and the UE calibration bandwidth resource, and the information about the UE target operating bandwidth resource indicates that the UE target operating bandwidth resource is at least one bandwidth resource in the set including the UE candidate operating bandwidth resource and the UE calibration bandwidth resource. The UE candidate operating bandwidth resource does not include the UE calibration bandwidth resource, and the UE calibration bandwidth resource may be a frequency resource configured by signaling or preconfigured. The UE receives the frequency resource location information of the UE candidate operating bandwidth resource from the gNB.

Figure 5:
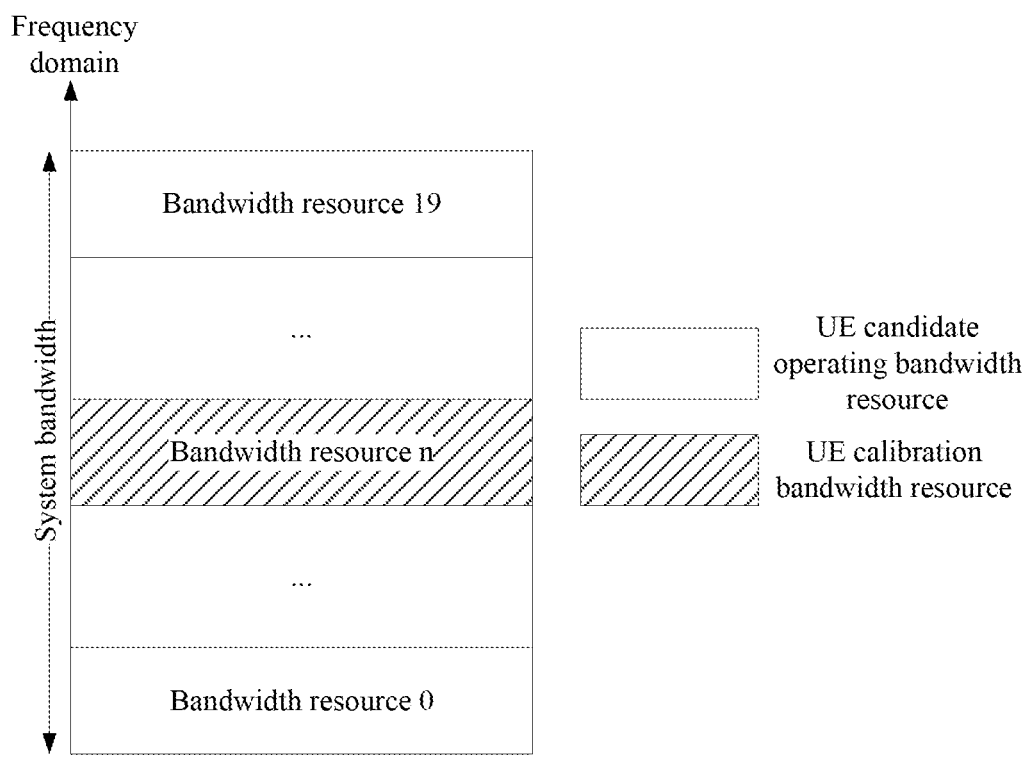
FIG. 5 is a schematic diagram of a UE candidate operating bandwidth resource according to an embodiment of this application.

In the embodiments of this application, the UE candidate operating bandwidth resource may also be described as a UE selectable operating bandwidth resource, a UE possible operating bandwidth resource, M1 bandwidth resources that can be used as operating bandwidth resources of the UE, or other names. This is not limited in this application. M1 is an integer greater than or equal to 1. Further, as described above, the UE candidate operating bandwidth resource may further include the UE calibration bandwidth resource. The UE source operating bandwidth resource may be at least one bandwidth resource of the UE candidate operating bandwidth resource. FIG. 5 is a schematic diagram of a UE candidate operating bandwidth resource. In an example of FIG. 5, system bandwidth is 400 MHz, bandwidth supported by the UE is 20 MHz, bandwidth of one bandwidth resource of the UE candidate operating bandwidth resource is 20 MHz, and the UE calibration bandwidth resource is 20 MHz. A system resource includes 20 bandwidth resources, and the bandwidth resources do not overlap. One of the 20 bandwidth resources is the UE calibration bandwidth resource, and the other 19 bandwidth resources are the UE candidate operating bandwidth resource; or the 20 bandwidth resources are the UE candidate operating bandwidth resource, and one of the 20 bandwidth resources is the UE calibration bandwidth resource. The UE source operating bandwidth resource(s) is/are at least one of 19 bandwidth resources, and the 19 bandwidth resources are 19 bandwidth resources obtained by subtracting the UE calibration bandwidth resource from the 20 bandwidth resources included in the system resource. The UE target bandwidth resource is at least one bandwidth resource of the UE candidate operating bandwidth resource. The bandwidth resources shown in FIG. 5 do not overlap, and the bandwidth resources are consecutive resources. Alternatively, the bandwidth resources overlap, and the bandwidth resources may be consecutive or inconsecutive resources. This is not limited in this application.

When the gNB sends the frequency resource location information of the UE candidate operating bandwidth resource to the UE, for a bandwidth resource of the candidate operating bandwidth resource, frequency resource location information of the bandwidth resource may be any one of the foregoing first type of frequency resource location information to fifth type of frequency resource location information. Further, when the gNB sends the frequency resource location information of the UE candidate operating bandwidth resource to the UE, frequency resource location information of different bandwidth resources of the candidate operating bandwidth resource may be sent in one signaling, or may be sent in different signaling. This is not limited in this application.

When the gNB configures the UE calibration bandwidth resource for the UE in the signaling configuration manner, or in other words, when the gNB sends the frequency resource location information of the UE calibration bandwidth resource to the UE, the signaling may be the same as or may be different from a signaling used by the gNB to send the frequency resource location information of the UE candidate operating bandwidth resource to the UE. This is not limited in this application. When the signaling used by the gNB to configure the UE calibration bandwidth resource for the UE is the same as the signaling used by the gNB to send the frequency resource location information of the UE candidate operating bandwidth resource to the UE, the signaling may include identification information used to indicate which frequency resource is the UE calibration bandwidth resource.

In the first type of information about the target operating bandwidth resource, to simplify description, it may also be described as that the information about the UE target operating bandwidth resource indicates that the UE target operating bandwidth resource(s) is/are at least one of M2 bandwidth resources. When the information about the UE target operating bandwidth resource indicates that the UE target operating bandwidth resource is at least one bandwidth resource of the UE candidate operating bandwidth resource, M2 is equal to a quantity of bandwidth resources included in the UE candidate operating bandwidth resource, and the bandwidth resources included in the UE candidate operating bandwidth resource may also be described as the M2 bandwidth resources. When the information about the UE target operating bandwidth resource indicates that the UE target operating bandwidth resource is at least one bandwidth resource in the set including the UE candidate operating bandwidth resource and the UE calibration bandwidth resource, M2 is equal to a quantity of bandwidth resources included in the set including the UE candidate operating bandwidth resource and the UE calibration bandwidth resource, and the set including the UE candidate operating bandwidth resource and the UE calibration bandwidth resource may also be described as the M2 bandwidth resources. In the first type of information about the target operating bandwidth resource, the information about the UE target operating bandwidth resource may be any one of the following first type of indication information to third type of indication information, and is used to indicate that the UE target operating bandwidth resource(s) is/are at least one of the M2 bandwidth resources. M2 is an integer greater than 1.

The first type of indication information includes K1=M2 information bits. The K1 information bits are one-to-one corresponding to the M2 bandwidth resources. When a value of an information bit is t1, it is considered that the UE target bandwidth resource includes a bandwidth resource corresponding to the information bit. When a value of an information bit is t2, it is considered that the UE target bandwidth resource does not include a bandwidth resource corresponding to the information bit. Both t1 and t2 are integers. For example, t1 is 1, and t2 is 0. By using the first type of indication information, values of bits in a bitmap may be changed, to flexibly perform resource configuration, and flexibly indicate that the UE target bandwidth resource(s) is/are at least one of the M2 bandwidth resources.

A second type of indication information includes K2 information bits. $K2=\lceil \log_2(K1) \rceil$, where K1 is the same as K1 in the first type of indication information. If a value of the K2 information bits is K2_X, it is considered that the UE target bandwidth resource is a $(K2\_X)^{th}$ bandwidth resource of the M2 bandwidth resources. When K2_X is counted from 0, K2_X is an integer greater than or equal to 0 and less than K1. When K2_X is counted from 1, K2_X is an integer greater than or equal to 1 and less than or equal to K1. For example, if M2=8, K2=3, and when K2_X value is 1, the UE target bandwidth resource is a first bandwidth resource of the M2 bandwidth resources. If the second type of indication information is used, it can be flexibly indicated that the UE target bandwidth resource is any one of the M2 bandwidth resources, and signaling overheads of the indication information can be further reduced through binary coding.

The third type of indication information includes K3 information bits. K3 is an integer. A pre-configuration method is used to configure that K3_X corresponds to at least one bandwidth resource. K3_X is a possible value of the K3 information bits, and the at least one bandwidth resource is included in the M2 bandwidth resources. If a value of the K3 information bits is K3_X, it is considered that the bandwidth resource corresponding to K3_X is the UE target bandwidth resource. For example, Table 1 shows a possible correspondence between K3_X and a bandwidth resource. In Table 1, M2=8 and K3=1 are used as an example. K3_X may be 0 or 1. When K3_X is 0, bandwidth resource 0, bandwidth resource 1, bandwidth resource 2, and bandwidth resource 3 that correspond to K3_X are considered as the UE target bandwidth resource. When K3_X is 1, bandwidth resource 4, bandwidth resource 5, bandwidth resource 6, and bandwidth resource 7 that correspond to K3_X are considered as the UE target bandwidth resource. In the embodiments of this application, considering a bandwidth resource as the UE target bandwidth resource may also be described as that the bandwidth resource may be used as the UE target bandwidth resource. Table 1 shows only one possible example. During actual application, the correspondence between K3_X and a bandwidth resource may be any other relationship. This is not limited in this application. By using the third type of indication information, it can be flexibly indicated that the UE target bandwidth resource is any one of the M2 bandwidth resources, and signaling overheads of the indication information can be further reduced through binary coding.

TABLE 1

Correspondence between K3_X and a bandwidth resource

| K3_X | Bandwidth resource (numbered from 0) |
|---|---|
| 0 | Bandwidth resource 0, bandwidth resource 1, bandwidth resource 2, and bandwidth resource 3 |
| 1 | Bandwidth resource 4, bandwidth resource 5, bandwidth resource 6, and bandwidth resource 7 |

By using the first type of information about the target operating bandwidth resource, the UE target operating bandwidth resource may be configured for the UE by using a relatively small quantity of information bits, as well as indicating that the UE target operating bandwidth resource(s) is/are at least one of a plurality of bandwidth resources.

Second type of information about the target operating bandwidth resource:

In the first bandwidth resource configuration method, the information about the UE target operating bandwidth resource that is sent by the gNB to the UE includes frequency resource location information of the UE target operating bandwidth resource. For a bandwidth resource of the UE target operating bandwidth resource, frequency resource location information of the bandwidth resource may be any one of the foregoing first type of frequency resource location information to fifth type of frequency resource location information. By using the second type of information about the target operating bandwidth resource, a resource of a system resource may be flexibly configured as the UE target operating bandwidth resource. The following three advantages can be gained by flexibly configuring a resource for the UE for communication between the gNB and the UE.

First advantage: A resource with relatively good channel quality in the system resource is configured for the UE, thereby increasing a rate of data transmission between the gNB and the UE.

Second advantage: A parameter including a subcarrier spacing and a CP can be flexibly configured for the UE, to meet a quality of service (QoS) requirement of a service of the UE. Quality of service includes a latency and/or a block error rate (BLER). In a wireless communications system, for example, a 5G system, to support various types of services having different quality of service requirements, different parameters may be used for data transmission of different types of services of different UEs or same UE.

Third advantage: A forward compatible communications system is provided. The network device flexibly configures an operating bandwidth resource for the UE, so that the network device can flexibly configure a blank resource in the system resource. Various possible communications systems may be introduced into the blank resource, so that the communications system evolves flexibly in the system resource. Further, if a plurality of communications systems need to be supported in the system resource, by flexibly configuring the blank resource, a resource in the blank resource may be configured for each of the plurality of communications systems based on load of each communications system, and an overall rate of data transmission of the plurality of communications systems may be increased in the system resource.

A person skilled in the art may understand that, in the three technical solutions provided in the foregoing embodiments of this application and methods related to the three technical solutions, all methods in which a resource can be flexibly configured may have the foregoing three advantages.

In the first bandwidth resource configuration method provided in the embodiment of this application, the UE may receive, in the calibration bandwidth resource, the information about the UE target operating bandwidth resource from the gNB for the UE, so that the UE can calibrate a configuration of an operating bandwidth resource of the UE. Therefore, a probability that the gNB and the UE have inconsistent understandings about the operating bandwidth resource of the UE can be reduced, or when the gNB and the UE have inconsistent understandings about the operating bandwidth resource of the UE, corresponding calibration can be performed, so that the gNB and the UE can have consistent understandings about the operating bandwidth resource of the UE.

Figure 6:
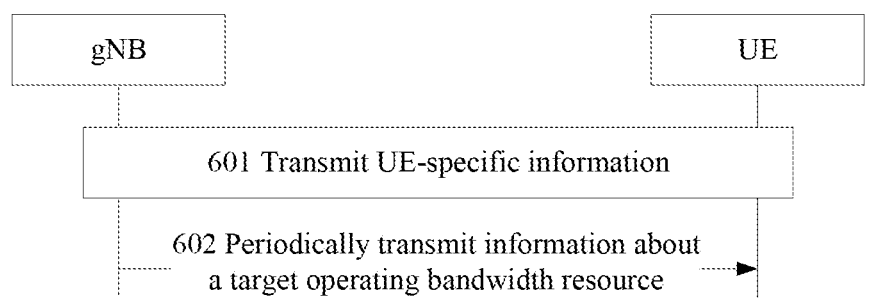
FIG. 6 is a schematic diagram of a second bandwidth resource configuration method according to an embodiment of this application.

A second method for bandwidth resource configuration provided in an embodiment of this application is described below in detail with reference to FIG. 6. The method corresponds to that a gNB periodically sends information about a UE target operating bandwidth resource to UE in the first technical solution provided in the embodiments of this application.

Step 601: A gNB communicates first UE specific information of UE with the UE in a UE source operating bandwidth resource.

Step 602: The gNB sends information about a UE target operating bandwidth resource to the UE in a UE calibration bandwidth resource of the UE in a first period. The UE target operating bandwidth resource is used by the gNB to communicate second UE specific information of the UE with the UE. The UE source operating bandwidth resource is not totally the same as the UE calibration bandwidth resource. The first period includes an integer quantity of first time units.

Step 602 may include step 202.

The gNB may periodically send the information about the UE target operating bandwidth resource to the UE based on the first period. That the first period includes an integer quantity of first time units may also be described as that, the first period includes N1 first time units, and N1 is an integer greater than 1. In a first period, the gNB may send the information about the UE target operating bandwidth resource to the UE in the UE calibration bandwidth resource of the UE in N2 first time units in the first period. N2 is an integer less than or equal to N1.

The gNB and the UE may determine the first period based on a preconfiguration. Alternatively, the gNB may send signaling to the UE, and the signaling includes a configuration of the first period. Correspondingly, the UE receives the signaling from the gNB, and the UE determines the first period based on the received signaling. When the first period is preconfigured or configured by signaling, the first period may be configured as an integer quantity of time units. For example, the time unit is the first time unit. Alternatively, the first period may be configured as a specific time length. A unit of the time length is a commonly used unit of time such as a second or a millisecond. In the embodiments of this application, the time unit may also be referred to as a unit of time, and includes a commonly used unit of time in the field of communications systems, such as a symbol, a slot, a mini-slot, a subframe, or a radio frame. When a communications system supports a plurality of parameters, because time units corresponding to different parameters have different lengths, when the first period is configured as an integer quantity of first time units, a parameter corresponding to the first time unit may be further configured. The parameter includes at least one of a subcarrier spacing or a CP. For example, a subcarrier spacing corresponding to the first time unit may be configured to be the same as a subcarrier spacing corresponding to an operating bandwidth resource of the UE, or may be configured as a reference subcarrier spacing, where the reference subcarrier spacing is a subcarrier spacing preconfigured based on a carrier frequency domain; or may be configured for the UE by signaling from the gNB to the UE.

The gNB and the UE may determine the N2 first time units in the first period based on a pre-configuration. Alternatively, the gNB may send signaling to the UE, and the signaling includes a configuration of the N2 first time units in the first period. Correspondingly, the UE receives the signaling from the gNB, and the UE determines the N2 first time units in the first period based on the received signaling. The N2 first time units in the first period may be correspondingly configured by any one of the following first type of configuration information to third type of configuration information.

The first type of configuration information includes an offset P1 and a step length P2. The first time unit of the N2 first time units in the first period is a $(P1)^{th}$ first time unit in the first period, and a distance between two adjacent first time units of the N2 first time units in the first period is P2 first time units. P1 and P2 are integers. By using the first type of configuration information, the N2 first time units in the first period may be indicated with the offset P1 and the step length by using a relatively small quantity of information bits. The first type of configuration information is applicable to an equal-spacing configuration. A person skilled in the art may understand that, when N2=1, the first type of configuration information may alternatively not include the step length P2.

A second type of configuration information includes P3 information bits. P3 is equal to a quantity of first time units included in the first period. In other words, P1 is equal to N1. The P3 information bits are one-to-one corresponding to the first time units included in the first period. When a value of an information bit is t1, it is considered that a first time unit corresponding to the information bit is included in the N2 first time units in the first period described in this step. When a value of an information bit is t2, it is considered that a first time unit corresponding to the information bit is not included in the N2 first time units in the first period described in this step. Both t1 and t2 are integers. For example, t1 is 1, and t2 is 0. By using the second type of configuration information, values of information bits may be changed, to flexibly configure that at least one first time unit in the first period may be used to transmit the information about the UE target operating bandwidth resource. The second type of configuration information is applicable to consecutive and inconsecutive configuration in time domain.

The third type of configuration information includes a value N2. Any N2 first time units in the first period are the N2 first time units in the first period described in this step. In a TDD system, the gNB may perform uplink/downlink configuration based on a parameter such as a traffic volume. The uplink/downlink configuration is used to configure whether a time unit is used for downlink (DL) transmission or uplink (UL) transmission. By using the third type of configuration information, the gNB may flexibly select a first time unit based on uplink/downlink configuration, and send the information about the UE target operating bandwidth resource to the UE in the selected first time unit.

Further, in a first period or in one or more of N2 first time units in the first period, if the gNB does not need to reconfigure the operating bandwidth resource for the UE, the gNB may not send the information about the UE target operating bandwidth resource to the UE, to save signaling overheads.

In the embodiments of this application, the gNB sends the information about the UE target operating bandwidth resource to the UE in the first period or in one or more of the N2 first time units in the first period. The information may be carried by a physical channel A. For example, the physical channel A is a PDCCH. It may also be described as that the gNB sends the physical channel A to the UE in the first period or in one or more of the N2 first time units in the first period, and the physical channel A carries the information about the UE target operating bandwidth resource. In the embodiments of this application, that the gNB sends a physical channel to the UE may also be described as that the gNB sends, to the UE, information carried by the physical channel.

The UE receives, in the UE calibration bandwidth resource of the UE in the first period, the information about the UE target operating bandwidth resource from the gNB to the UE. The UE target operating bandwidth resource is used by the gNB to communicate the second UE specific information of the UE with the UE. The UE source operating bandwidth resource is not totally the same as the UE calibration bandwidth resource. The first period includes the integer quantity of first time units. The UE may use the following first receiving method to periodically receive the information about the UE target operating bandwidth resource; or by using the following second receiving method, the UE receives the information about the UE target operating bandwidth resource based on determining whether the operating bandwidth resource of the UE needs to be calibrated.

In the first receiving method, the UE periodically receives the information about the UE target operating bandwidth resource. In a first period, the UE receives, in the UE calibration bandwidth resource of the UE in N2 first time units in the first period, the information about the UE target operating bandwidth resource from the gNB to the UE. The N2 first time units in the first period are described as above. Details are not described herein again.

Figure 7:
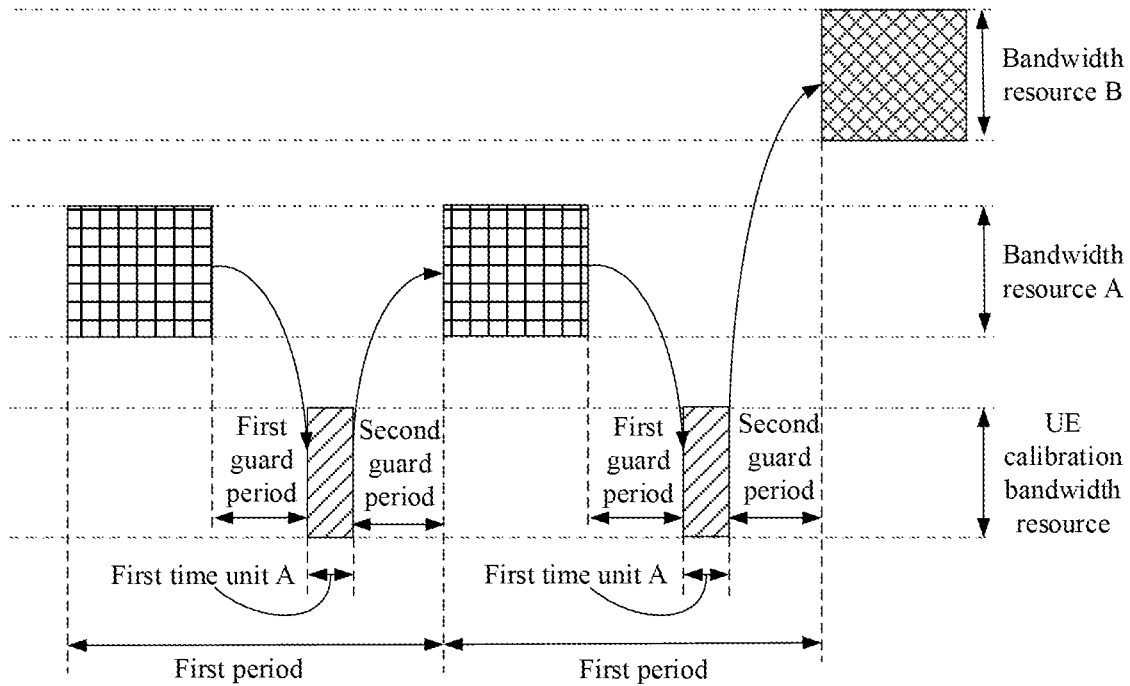
FIG. 7 is a schematic diagram showing that UE receives, in a UE calibration bandwidth resource, information about a UE target operating bandwidth resource from a gNB according to an embodiment of this application.

FIG. 7 is a schematic diagram showing that a UE receives, in a UE calibration bandwidth resource, information about a UE target operating bandwidth resource from a gNB. As shown in FIG. 7, a first period is configured, and one first time unit A in the first period is configured, to transmit the information about the UE target operating bandwidth resource. In other words, N2=1. The gNB sends the information about the UE target operating bandwidth resource to the UE in the UE calibration bandwidth resource of the UE in the first time unit A in the first period. In an example of FIG. 7, N2=1, but in practice, N2 may be any integer greater than or equal to 1 and less than or equal to N1. As shown in FIG. 7, in the $1^{st}$ first period, before the UE receives the information about the UE target operating bandwidth resource, an operating bandwidth resource of the UE is a bandwidth resource A. The UE receives, in the UE calibration bandwidth resource of the UE in a first time unit A in the $1^{st}$ first period, the information about the UE target operating bandwidth resource from the gNB. The information may indicate that the UE target operating bandwidth resource is the bandwidth resource A. The UE still uses the bandwidth resource A as the operating bandwidth resource of the UE. It may also be described as that, the UE does not update the operating bandwidth resource of the UE. In a second first period, before the UE receives the information about the UE target operating bandwidth resource, an operating bandwidth resource of the UE is the bandwidth resource A. The UE receives, in the UE calibration bandwidth resource of the UE in a first time unit A in the second first period, the information about the UE target operating bandwidth resource from the gNB. The information may indicate that the UE target operating bandwidth resource is a bandwidth resource B. The UE uses the bandwidth resource B as the operating bandwidth resource of the UE. In other words, the UE updates the operating bandwidth resource of the UE. It may also be described as that, the UE calibrates the operating bandwidth resource of the UE.

In the second receiving method, the UE receives the information about the UE target operating bandwidth resource based on determining whether the operating bandwidth resource of the UE needs to be calibrated. The UE starts or restarts a first timer if the UE receives, in the UE source operating bandwidth resource, the first UE specific information of the UE from the gNB. That the UE restarts a first timer may be as follows. If the UE receives, in the UE source operating bandwidth resource, the first UE specific information of the UE from the gNB, and during running of the first timer the UE restarts the first timer. After the first timer expires, the UE receives, in the UE calibration bandwidth resource of the UE, the information about the UE target operating bandwidth resource from the gNB. For example, if the first timer expires, the UE receives, in the UE calibration bandwidth resource of the UE in a first time unit after the timer expires, the information about the UE target operating bandwidth resource from the gNB to the UE. The first time unit may be one or more first time units, and the first time unit is included in one or more first periods, and is a first time unit of N2 first time units in the first period. In an implementation, if the first timer expires, the UE switches from the source operating bandwidth resource to the UE calibration bandwidth resource, and the UE receives, in the UE calibration bandwidth resource of the UE, the information about the UE target operating bandwidth resource from the gNB to the UE. In the second receiving method, if the UE needs to switch from the UE source operating bandwidth resource to the UE calibration bandwidth resource and/or needs to switch from the UE calibration bandwidth resource to the UE target operating bandwidth resource when receiving the information about the UE target operating bandwidth resource, the method can reduce switching of the UE between different bandwidth resources, thereby reducing an introduced switching time, saving a time domain air interface resource for the UE, and increasing a rate of data transmission. A possible scenario in which the UE needs to switch from the UE source operating bandwidth resource to the UE calibration bandwidth resource when receiving the information about the UE target operating bandwidth resource is as follows: Bandwidth capability of the UE is not sufficient to simultaneously support the UE source operating bandwidth resource and the UE calibration bandwidth resource. A possible scenario in which the UE needs to switch from the UE calibration bandwidth resource to the UE target operating bandwidth resource when receiving the information about the UE target operating bandwidth resource is as follows: Bandwidth capability of the UE is not sufficient to simultaneously support the UE calibration bandwidth resource and the UE target operating bandwidth resource.

In the embodiments of this application, that bandwidth capability of the UE is not sufficient to simultaneously support X bandwidth resources may be described as follows. Bandwidth capability of the UE is W, a set including frequencies at highest frequencies of the X bandwidth resources is $H_i, i=1, 2 \ldots X$, and a set including frequencies at lowest frequencies of the X bandwidth resources is $L_i, i=1, 2 \ldots X$, where $W<(h-l)$, $h=\max(H_i, i=1, 2 \ldots X)$, and $l=\min(L_i, i=1, 2 \ldots X)$.

In either method provided in the embodiments of this application, when the UE switches from bandwidth resource C to bandwidth resource D, a guard period may be configured for the UE to switch from bandwidth resource C to bandwidth resource D. The guard period is used by the UE to switch from one bandwidth resource to another bandwidth resource, and may also be referred to as a switching time, a guard time, or other names. This is not limited in this application. The "switch" may also be referred to as "retune" or other names. This is not limited in this application. The "retune" may be translated into retune in English. The guard period may be configured as an integer quantity of time units, or may be configured as a specific time length. A unit of the time length is a common unit of time such as second, millisecond, or microsecond. In the guard period of the UE, the gNB may not communicate with the UE.

For example, in the first period, before the UE receives, in the UE calibration bandwidth resource of the UE, the information about the UE target operating bandwidth resource from the gNB to the UE, the UE may switch from the UE source operating bandwidth resource to the UE calibration bandwidth resource in a first guard period. For another example, after the UE receives, in the UE calibration bandwidth resource of the UE, the information about the UE target operating bandwidth resource from the gNB to the UE, the UE may switch from the UE calibration bandwidth resource to the UE target operating bandwidth resource in a second guard period. For example, as described above, FIG. 7 is a schematic diagram showing that UE receives, in a UE calibration bandwidth resource, information about a UE target operating bandwidth resource from a gNB. In FIG. 7, the UE switches from the UE source operating bandwidth resource to the UE calibration bandwidth resource in a first guard period before a first time unit A, and the UE switches from the UE calibration bandwidth resource to the UE target operating bandwidth resource in a second guard period after the first time unit A. The first guard period and the second guard period may be the same or may be different. This is not limited in this application.

In the second bandwidth resource configuration method provided in the embodiment of this application, by using the first period, the information about the UE target operating bandwidth resource may be relatively fixedly transmitted in time domain, so that the UE can pertinently receive the information about the UE target operating bandwidth resource in time domain, thereby enhancing robustness of receiving the information about the UE target operating bandwidth resource by the UE, and further saving power of the UE.

Figure 8:
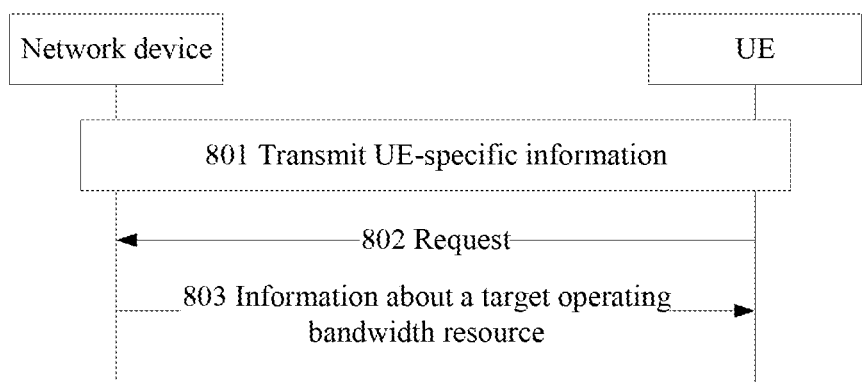
FIG. 8 is a schematic diagram of a third bandwidth resource configuration method according to an embodiment of this application.

A third method for bandwidth resource configuration provided in an embodiment of this application is described below in detail with reference to FIG. 8. The method corresponds to that a gNB sends information about a UE target operating bandwidth resource to UE based on a request of the UE in the first technical solution provided in the embodiments of this application.

Step 801: A gNB communicates first UE specific information of UE with the UE in a UE source operating bandwidth resource.

Step 802: The UE sends a first request to the gNB. The first request is used to request the gNB to send information about a UE target operating bandwidth resource to the UE.

The gNB receives the first request from the UE.

Optionally, the first request may be a scheduling request (SR). If the first request is the SR, the first request may be carried by an uplink control channel or an uplink data channel. The SR is signaling from the UE to the gNB to request the gNB to perform uplink scheduling for the UE, so that the UE can send data to the gNB based on uplink scheduling information. The SR is reused as the first request, so that signaling types in a system can be reduced, and a system design can be simplified.

Before the UE sends the first request to the gNB, the UE may further determine whether the UE needs to calibrate an operating bandwidth resource. If the UE needs to calibrate the operating bandwidth resource, the UE sends the first request to the gNB, to further reduce signaling overheads. Specifically, a timer is started if the UE receives, in the UE source operating bandwidth resource, the first UE specific information from the gNB. During running of the timer, if the UE receives, in the UE source operating bandwidth resource, the first UE specific information from the gNB, the timer is restarted. After the timer expires, the UE sends the first request to the gNB. By using the timer, when the UE does not communicate with the gNB within a period of time, the UE may consider whether the state of no communication caused by inconsistent understandings about the operating bandwidth resource of the UE between the gNB and the UE, and may consider calibrating the operating bandwidth resource of the UE.

Step 803: In a UE calibration bandwidth resource of the UE, the gNB sends the information about the UE target operating bandwidth resource to the UE, and the UE receives the information about the UE target operating bandwidth resource from the gNB. The UE target operating bandwidth resource is used to communicate second UE specific information of the UE with the UE. The UE source operating bandwidth resource is not totally the same as the UE calibration bandwidth resource.

Step 803 may include step 202.

A timing relationship between transmission of the first request and transmission of the information about the UE target operating bandwidth resource in the UE calibration bandwidth resource may be as follows. The first request is transmitted in a time unit n, and the information about the UE target operating bandwidth resource is transmitted in a time unit n+k. The information about the UE target operating bandwidth resource is transmitted after the first request is transmitted, n is an integer, and k is an integer greater than or equal to 0. For example, the gNB receives the first request in the time unit n, and sends the information about the UE target operating bandwidth resource to the UE in the time unit n+k. The UE sends the first request in the time unit n, and receives, in the time unit n+k, the information about the UE target operating bandwidth resource from the gNB. When a time unit for the transmission of the first request and a time unit for the transmission of the information about the UE target operating bandwidth resource correspond to different subcarrier spacings and/or CP types, indexes of the time units corresponding to the first request and the information about the UE target operating bandwidth resource may be adjusted. This is not limited in this application. For example, if the time unit for the transmission of the first request corresponds to a subcarrier spacing of 60 kHz, an index corresponding to the time unit may be n; or if the time unit for the transmission of the information about the UE target operating bandwidth resource corresponds to a subcarrier spacing of 15 kHz, an index corresponding to the time unit may be n/4, where 4=60/15. A cause of such a phenomenon may be as follows. The time unit for the transmission of the first request is a slot, and the slot includes seven symbols; and the time unit for the transmission of the information about the UE target operating bandwidth resource is a slot, and the slot includes seven symbols. A symbol length corresponding to 60 kHz is ¼ of a symbol length corresponding to 15 kHz, and a slot length corresponding to 60 kHz is ¼ of a slot length corresponding to 15 kHz. Therefore, in a same time, an index of a slot of 60 kHz may be four times of an index of a slot of 15 kHz. The index of the slot does not exceed a value range of the index of the slot.

The gNB and the UE may determine a value of k based on a system pre-configuration. The value of k may be preconfigured as a constant, or may be preconfigured as any one or more values of n+k1 to n+k1+L. L and k1 are integers. For example, k1 and L are preconfigured constants.

Alternatively, the gNB may send signaling to the UE, to indicate the value of k by the signaling. The UE receives signaling from the gNB, and determines the value of k based on a signaling configuration.

In the third bandwidth resource configuration method provided in the embodiment of this application, if the UE needs to switch from the UE source operating bandwidth resource to the UE calibration bandwidth resource and/or needs to switch from the UE calibration bandwidth resource to the UE target operating bandwidth resource when receiving the information about the UE target operating bandwidth resource, the method can reduce switching of the UE between different bandwidth resources, thereby reducing introducing a switching time, saving a time domain air interface resource for the UE, and increasing a rate of data transmission.

Further, in the first bandwidth resource configuration method to the third bandwidth resource configuration method that are provided in the embodiments of this application, the gNB may also send the information about the UE target operating bandwidth resource to the UE in the UE source operating bandwidth resource. Correspondingly, the UE may also receive, in the UE source operating bandwidth resource of the UE, the information about the UE target operating bandwidth resource from the gNB. In the method, frequency of sending the information about the UE target operating bandwidth resource in the UE source operating bandwidth resource may be configured to be higher than frequency of sending the information about the UE target operating bandwidth resource in the UE calibration bandwidth resource. For example, a period for sending the information about the UE target operating bandwidth resource in the UE source operating bandwidth resource may be configured to be shorter than a period for sending the information about the UE target operating bandwidth resource in the UE calibration bandwidth resource. For another example, a period for sending the information about the UE target operating bandwidth resource in the UE source operating bandwidth resource of the UE is configured to be the same as a period for sending the information about the UE target operating bandwidth resource in the UE calibration bandwidth resource, and in the period, time units that can be used to transmit the information about the UE target operating bandwidth resource in the UE source operating bandwidth resource are more than time units that can be used to transmit the information about the UE target operating bandwidth resource in the UE calibration bandwidth resource. For another example, when determining that the UE needs to perform calibration, the UE may receive, in the UE calibration bandwidth resource, the information about the UE target operating bandwidth resource from the gNB. These methods can make the UE switch to the UE calibration bandwidth resource at an interval of a relatively long period of time or only when determining that calibration needs to be performed, to receive the information about the UE target operating bandwidth resource, and configure the operating bandwidth resource of the UE. The methods can further reduce switching of the UE between different bandwidth resources, thereby reducing introducing a switching time, saving a time domain air interface resource for the UE, and increasing a rate of data transmission.

Figure 9:
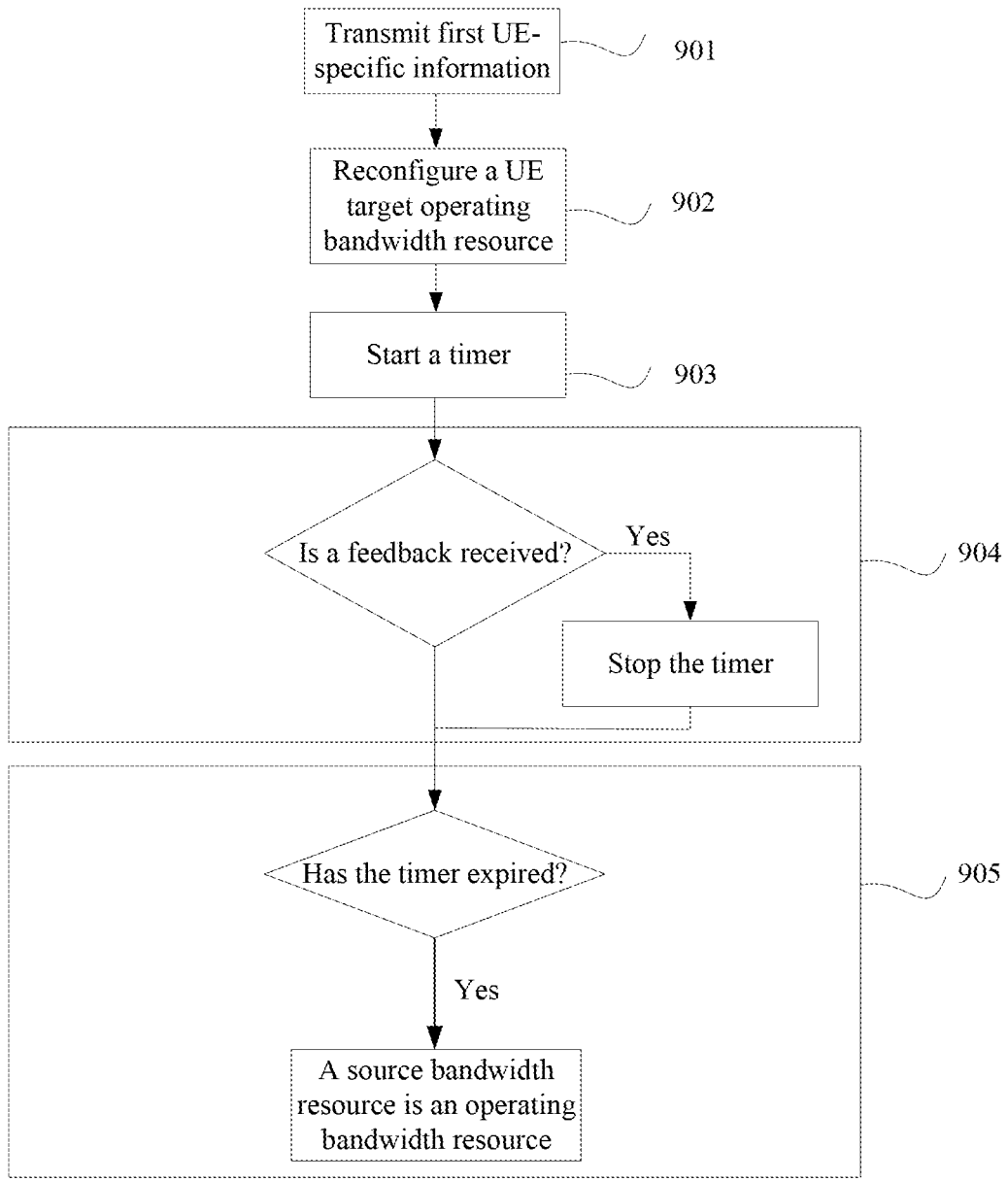
FIG. 9 is a schematic diagram of a fourth bandwidth resource configuration method according to an embodiment of this application.

A fourth method for bandwidth resource configuration provided in an embodiment of this application is described below in detail with reference to FIG. 9. The method corresponds to a corresponding design on a gNB side in the second technical solution provided in the embodiments of this application. FIG. 9 is a corresponding schematic flowchart for implementing the fourth bandwidth resource configuration method on the gNB side.

Step 901: A gNB communicates first UE specific information of UE with the UE in a UE source operating bandwidth resource.

Step 902: In the UE source operating bandwidth resource, the gNB sends information about a UE target operating bandwidth resource to the UE, and the UE receives the information about the UE target operating bandwidth resource from the gNB. The UE target operating bandwidth resource is used for transmission of second UE specific information of the UE with the UE.

In step 902, descriptions of content of the information about the UE target operating bandwidth resource, a transmission method for the information about the UE target operating bandwidth resource, and other content related to the information about the UE target operating bandwidth resource are similar to those in step 202. Details are not described herein again. A main difference between step 902 and step 202 is as follows. In step 202, the UE calibration bandwidth resource is introduced, and the gNB sends the information about the UE target operating bandwidth resource to the UE in the UE calibration bandwidth resource. In step 902, the gNB sends the information about the UE target operating bandwidth resource to the UE in the UE source operating bandwidth resource.

Step 903: The gNB starts a second timer.

Step 904: During running of the second timer, if the gNB receives a feedback from the UE, the gNB stops the second timer. The feedback is a feedback in response to a channel carrying the information about the UE target operating bandwidth resource.

The feedback may be one-bit information.

A value of the feedback may include an acknowledgment feedback, or may include an acknowledgment feedback and a negative acknowledgment feedback.

When the value of the feedback includes the acknowledgment feedback and does not include the negative acknowledgment feedback: If the gNB receives the feedback, the gNB considers that the UE may have correctly received the information about the UE target operating bandwidth resource, and considers that the UE may use the UE target operating bandwidth resource as an operating bandwidth resource of the UE. Therefore, the gNB may consider the UE target operating bandwidth resource as the operating bandwidth resource of the UE. If the gNB receives no feedback, the gNB considers that the UE may fail to receive or fail to correctly receive the information about the UE target operating bandwidth resource, considers that the UE may not use the UE target operating bandwidth resource as the operating bandwidth resource of the UE, and considers that the UE may use the UE source operating bandwidth resource as the operating bandwidth resource of the UE. Therefore, the gNB may consider the UE source operating bandwidth resource as the operating bandwidth resource of the UE. In the method, the acknowledgment feedback may also be referred to as a "feedback" for short.

When the value of the feedback includes the acknowledgment feedback and the negative acknowledgment feedback: If the gNB receives the acknowledgment feedback, the gNB considers that the UE may have correctly received the information about the UE target operating bandwidth resource, and considers that the UE may use the UE target operating bandwidth resource as an operating bandwidth resource of the UE. Therefore, the gNB may consider the UE target operating bandwidth resource as the operating bandwidth resource of the UE. If the gNB receives no acknowledgment feedback or receives the negative acknowledgment feedback, the gNB considers that the UE may fail to receive or fail to correctly receive the information about the UE target operating bandwidth resource, considers that the UE may not use the UE target operating bandwidth resource as the operating bandwidth resource of the UE, and considers that the UE may use the UE source operating bandwidth resource as the operating bandwidth resource of the UE. Therefore, the gNB may consider the UE source operating bandwidth resource as the operating bandwidth resource of the UE.

Step 905: After the second timer expires, the gNB considers the UE source operating bandwidth resource as an operating bandwidth resource of the UE.

In the fourth bandwidth resource configuration method provided in the embodiment of this application, by a fallback mechanism of the gNB, it can be ensured that the UE and the gNB have consistent understandings about the operating bandwidth resource of the UE.

Figure 10:
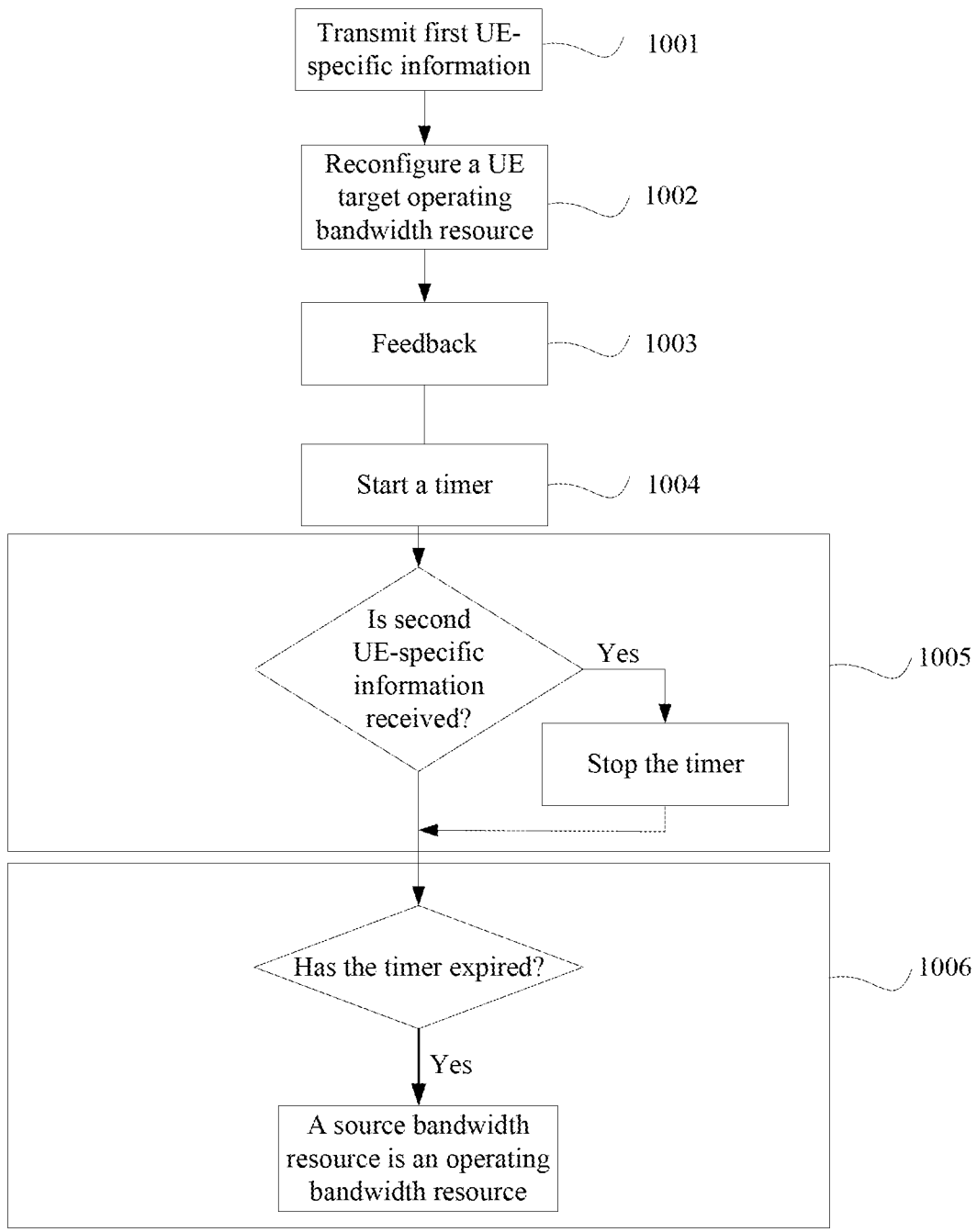
FIG. 10 is a schematic diagram of a fifth bandwidth resource configuration method according to an embodiment of this application.

A fifth method for bandwidth resource configuration provided in an embodiment of this application is described below in detail with reference to FIG. 10. The method corresponds to a first design on a UE side in the second technical solution provided in the embodiments of this application. FIG. 10 is a corresponding schematic flowchart for implementing the fifth bandwidth resource configuration method on the UE side.

Step 1001: A gNB communicates first UE specific information of UE with the UE in a UE source operating bandwidth resource.

Step 1002: In the UE source operating bandwidth resource, the gNB sends information about a UE target operating bandwidth resource to the UE, and the UE receives the information about the UE target operating bandwidth resource from the gNB. The UE target operating bandwidth resource is used for transmission of second UE specific information of the UE with the UE.

Step 1002 is the same as step 902.

Step 1003: The UE sends a feedback to the gNB. The feedback is a feedback in response to a channel carrying the information about the UE target operating bandwidth resource.

The feedback in step 1003 may be the same as the feedback in step 904.

Step 1004: The UE starts a third timer.

Step 1005: Stop the third timer if second UE specific information from the gNB is received in the UE target operating bandwidth resource.

Step 1006: After the third timer expires, consider the UE source operating bandwidth resource as an operating bandwidth resource of the UE.

In the fifth bandwidth resource configuration method provided in the embodiment of this application, if the UE receives no second UE specific information till the third timer expires, the UE considers that the gNB may fail to receive or fail to correctly receive the feedback, and the UE considers that the gNB may use the UE source bandwidth resource as the operating bandwidth resource of the UE. Therefore, the UE may consider the UE source bandwidth resource as the operating bandwidth resource of the UE, so that the gNB and the UE can have consistent understandings about the operating bandwidth resource of the UE.

Figure 11:
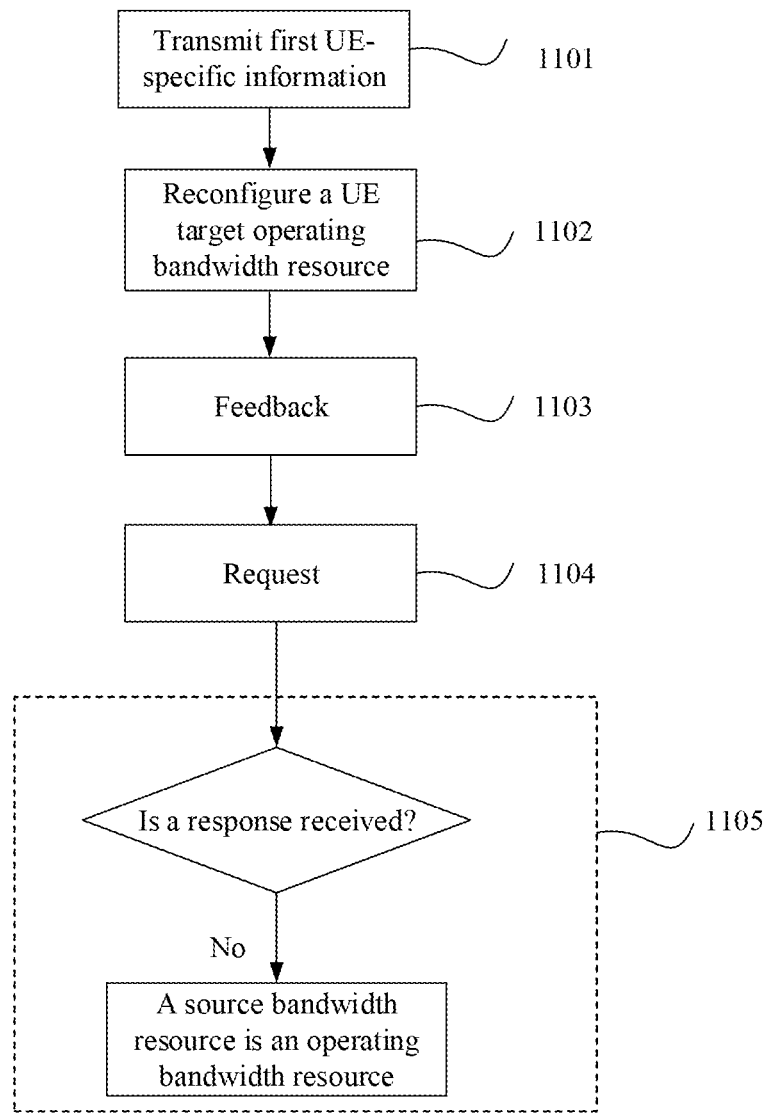
FIG. 11 is a schematic diagram of a sixth bandwidth resource configuration method according to an embodiment of this application.

A sixth method for bandwidth resource configuration provided in an embodiment of this application is described below in detail with reference to FIG. 11. The method corresponds to a second corresponding design on a UE side in the second technical solution provided in the embodiments of this application. FIG. 11 is a corresponding schematic flowchart for implementing the sixth bandwidth resource configuration method on the UE side.

Step 1101: A gNB communicates first UE specific information of UE with the UE in a UE source operating bandwidth resource.

Step 1102: In the UE source operating bandwidth resource, the gNB sends information about a UE target operating bandwidth resource to the UE, and the UE receives the information about the UE target operating bandwidth resource from the gNB. The UE target operating bandwidth resource is used for transmission of second UE specific information of the UE with the UE.

Step 1102 is the same as step 1002.

Step 1103: The UE sends a feedback to the gNB. The feedback is a feedback in response to a channel carrying the information about the UE target operating bandwidth resource.

Step 1103 is the same as step 1003.

Step 1104: The UE sends a second request to the gNB. The gNB may receive the second request.

Step 1105: If the UE receives, in the UE target operating bandwidth resource, no first response from the gNB, the UE considers the UE source operating bandwidth resource as an operating bandwidth resource of the UE. The first response is in response to the second request.

The first response may be one-bit information, or may be UE specific information or other information. This is not limited in this application.

A timing relationship between transmission of the second request and transmission of the first response is similar to the timing relationship between the transmission of the first request and the transmission of the information about the UE target operating bandwidth resource in the UE calibration bandwidth resource in step 803. Details are not described herein again. The transmission of the second request corresponds to the transmission of the first request, and the transmission of the first response corresponds to the transmission of the information about the UE target operating bandwidth resource in the UE calibration bandwidth resource.

In the sixth bandwidth resource configuration method provided in the embodiment of this application, if the UE receives no first response, the UE considers that the gNB may fail to receive or fail to correctly receive the feedback, and the UE considers that the gNB may use the UE source bandwidth resource as the operating bandwidth resource of the UE. Therefore, the UE may consider the UE source bandwidth resource as the operating bandwidth resource of the UE, so that the gNB and the UE can have consistent understandings about the operating bandwidth resource of the UE.

Figure 12:
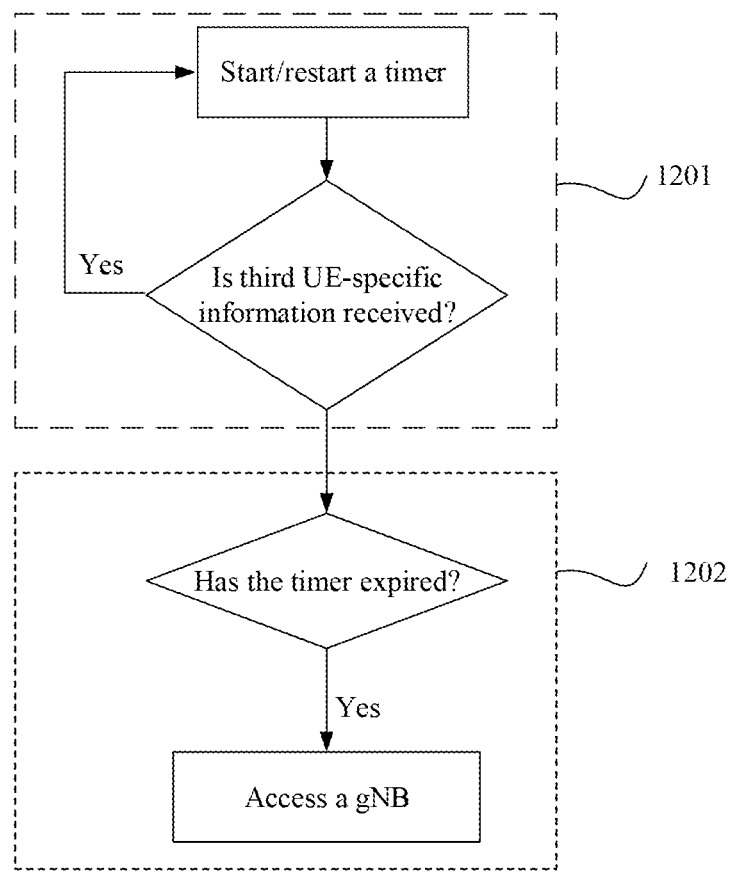
FIG. 12 is a schematic diagram of a first access method according to an embodiment of this application.

A first method for accessing provided in an embodiment of this application is described below in detail with reference to FIG. 12. The method corresponds to the third technical solution provided in the embodiments of this application. FIG. 12 is a corresponding schematic flowchart for implementing the first access method on a UE side.

Step 1201: Start or restart a fourth timer if UE receives, in an operating bandwidth resource of the UE, third UE specific information from a gNB.

The UE may start or restart the fourth timer if the UE receives, in the operating bandwidth resource of the UE, the third UE specific information from the gNB. Further, the fourth timer may be started or restarted after the operating bandwidth resource of the UE is reconfigured. Specifically, the UE communicates first UE specific information of the UE with the network device in a UE source operating bandwidth resource. The network device sends information about a UE target operating bandwidth resource to the UE in the UE source operating bandwidth resource. Correspondingly, the UE receives, in the UE source operating bandwidth resource, the information about the UE target operating bandwidth resource from the network device, and considers the UE target operating bandwidth resource as the operating bandwidth resource of the UE, and the UE starts the fourth timer. The UE target operating bandwidth resource is used by the UE to communicate the third UE specific information of the UE with the network device. After the UE target operating bandwidth resource is used as the operating bandwidth resource of the UE, if the UE receives, in the operating bandwidth resource of the UE, the third UE specific information from the gNB, the UE starts or restarts the fourth timer.

Step 1202: The UE accesses the gNB if the fourth timer expires.

After the access to the gNB, the gNB may send information to the UE, and the UE may receive the information from the gNB to the UE. The information indicates a bandwidth resource used by the gNB to communicate UE specific information with the UE. For example, the information is the information about the UE target operating bandwidth resource that is described in the foregoing methods.

In the first access method, based on the timer, if the fourth timer expires in the operating bandwidth resource of the UE, the UE considers that the UE and the gNB may have inconsistent understandings about the operating bandwidth resource of the UE, and the UE accesses the gNB. After the access, the UE and the gNB can have consistent understandings about the operating bandwidth resource of the UE.

Figure 13:
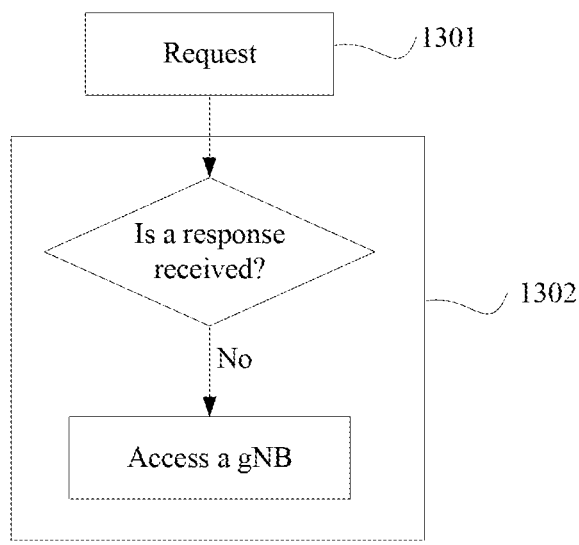
FIG. 13 is a schematic diagram of a second access method according to an embodiment of this application.

A second method for accessing provided in an embodiment of this application is described below in detail with reference to FIG. 13. The method corresponds to the third technical solution provided in the embodiments of this application. FIG. 13 is a corresponding schematic flowchart for implementing the second access method on a UE side.

Step 1301: UE sends a third request to a gNB.

Step 1302: The UE accesses the gNB if the UE receives, in an operating bandwidth resource of the UE, no second response from the gNB. The second response is in response to the third request.

The second response may be one-bit information, or may be UE specific information or other information. This is not limited in this application.

A timing relationship between transmission of the third request and transmission of the second response is similar to the timing relationship between the transmission of the first request and the transmission of the information about the UE target operating bandwidth resource in the UE calibration bandwidth resource in step 803. Details are not described herein again. The transmission of the third request corresponds to the transmission of the first request, and the transmission of the second response corresponds to the transmission of the information about the UE target operating bandwidth resource in the calibration bandwidth resource.

In the second access method, according to a request feedback mechanism, if no second response is received in the operating bandwidth resource of the UE, the UE considers that the UE and the gNB may have inconsistent understandings about the operating bandwidth resource of the UE, and the UE accesses the gNB. After the access, the UE and the gNB can have consistent understandings about the operating bandwidth resource of the UE.

In the first and second methods for accessing provided in the foregoing embodiments of this application, after the UE accesses the gNB, a bandwidth resource used by the UE to access the gNB may be configured as the operating bandwidth resource of the UE. Further, after the UE accesses the gNB, the gNB may send information to the UE in the bandwidth resource used by the UE to access the gNB, to configure the operating bandwidth resource of the UE for the UE. The information may be the foregoing described information about the UE target operating bandwidth resource.

In the first and second methods for accessing provided in the embodiments of this application, a method for accessing in which the UE accesses the gNB may be a method commonly used by a person skilled in the art. For example, the access method may be a random access method in a 5G system or an LTE system. The access method may include contention-based access and non-contention based access. The gNB and the UE may determine, in a preconfiguration manner, frequency resource location information of the bandwidth resource used by the UE to access the gNB. Alternatively, the gNB may configure, for the UE by signaling, frequency resource information of the bandwidth resource used by the UE to access the gNB. The UE determines, based on the received signaling from the gNB, the bandwidth resource that is configured by the gNB for the UE and that is used by the UE to access the gNB. The resource location information of the bandwidth resource used by the UE to access the gNB may be any one of the first type of frequency resource location information to the fifth type of frequency resource location information in step 201.

In the foregoing embodiments provided in this application, the methods provided in the embodiments of this application are separately described from perspectives of a gNB, UE, and interaction between the gNB and the UE. To implement functions described in the foregoing methods, the gNB and the UE may each include a hardware structure and/or a software module, to implement the functions in a form of the hardware structure, the software module, or the hardware structure and the software module. Whether one of the functions is implemented by the hardware structure, the software module, or the hardware structure and the software module depends on a particular application and design constraint condition of a technical solution.

Figure 14:
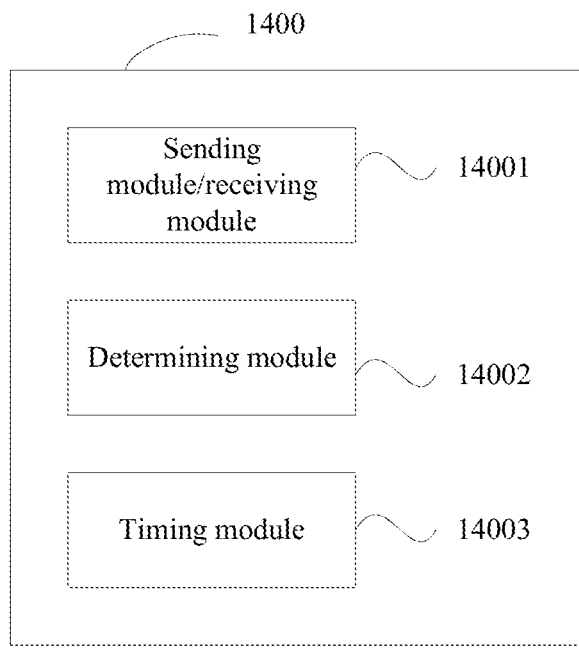
FIG. 14 is a schematic structural diagram of an apparatus according to an embodiment of this application.

FIG. 14 is a schematic structural diagram of an apparatus 1400 according to an embodiment of this application. The apparatus 1400 may be a gNB, or may be an apparatus applied to a gNB. When applied to the gNB, the apparatus can support the gNB in performing gNB functions described in the foregoing methods. The apparatus 1400 may be performed by a chip system. In the embodiments of this application, the chip system may include a chip, or may include a chip and other discrete device(s).

As shown in FIG. 14, the apparatus 1400 includes a sending module/receiving module 14001. In the embodiments of this application, the sending module/receiving module may also be referred to as a transceiver module.

When the apparatus 1400 is configured to implement or configured to support the gNB in performing the foregoing methods, the sending module/receiving module 14001 may be configured to send information about a UE target operating bandwidth resource, may be configured to send and/or receive first UE specific information, may be configured to send and/or receive second UE specific information, may be configured to send frequency resource location information of a UE candidate operating bandwidth resource, may be configured to send a configuration of a first period and a configuration of N2 first time units in the first period, may be configured to receive a first request, may be configured to receive a feedback, may be configured to receive a second request, may be configured to send a first response, may be configured to receive a third request, may be configured to send a second response, may be configured to send a downlink channel during access, and may be configured to receive an uplink channel during access. Correspondences between various possible information sent and/or received by the sending module/receiving module 14001 and the foregoing methods are detailed in the foregoing methods, and details are not described herein again.

The apparatus 1400 may further include a determining module 14002. The determining module 14002 may be coupled to other module(s) included in the apparatus 1400. For example, the other module(s) includes at least one of the sending module/receiving module 14001 or a timing module 14003. The coupling in the embodiments of this application is indirect coupling or connection between apparatuses, units, or modules for information exchange between the apparatuses, the units, or the modules, and may be in electrical, mechanical, or other forms. When the apparatus 1400 is configured to implement or configured to support the gNB in implementing the foregoing methods, the determining module 14002 may be configured to determine at least one of the information about the UE target operating bandwidth resource, the first UE specific information, the second UE specific information, the frequency resource location information of the UE candidate operating bandwidth resource, the configuration of the first period and the configuration of the N2 first time units in the first period, the first response, the second response, or information carried by the downlink channel during access that are sent by the sending module/receiving module 14001. Correspondences between various possible information determined by the determining module 14002 and the foregoing methods are detailed in the foregoing methods, and details are not described herein again.

When the apparatus 1400 is configured to implement or configured to support the gNB in performing the fourth bandwidth resource configuration method, the apparatus 1400 may further include the timing module 14003, configured to perform a function of a second timer. The timing module 14003 may be coupled to other module(s) included in the apparatus 1400. For example, the other module(s) includes at least one of the sending module/receiving module 14001 or the determining module 14002.

Figure 15:
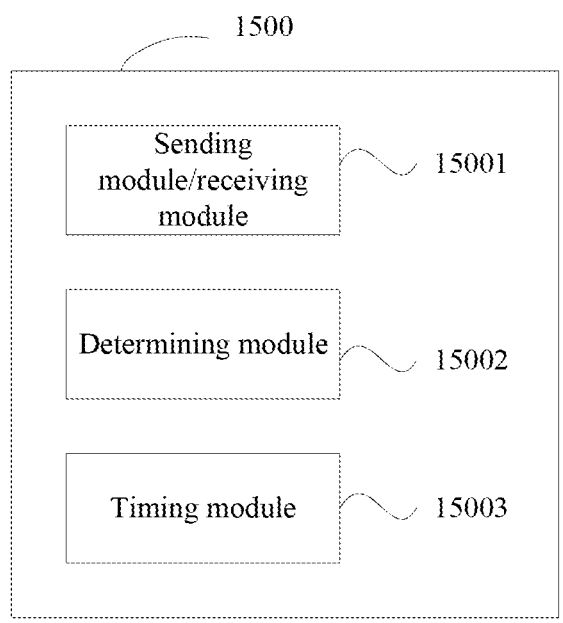
FIG. 15 is a schematic structural diagram of another apparatus according to an embodiment of this application.

FIG. 15 is a schematic structural diagram of an apparatus 1500 according to an embodiment of this application. The apparatus 1500 may be UE, or may be an apparatus applied to UE. When applied to the UE, the apparatus can support the UE in performing the functions of the UE that are described in the foregoing methods. The apparatus 1500 may be implemented by a chip system.

As shown in FIG. 15, the apparatus 1500 includes a sending module/receiving module 15001.

When the apparatus 1500 is configured to perform or configured to support the UE in performing the foregoing methods, the sending module/receiving module 15001 may be configured to receive information about a UE target operating bandwidth resource, may be configured to send and/or receive first UE specific information, may be configured to send and/or receive second UE specific information, may be configured to receive frequency resource location information of a UE candidate operating bandwidth resource, may be configured to receive a configuration of a first period and a configuration of N2 first time units in the first period, may be configured to send a first request, may be configured to send a feedback, may be configured to send a second request, may be configured to receive a first response, may be configured to send a third request, may be configured to receive a second response, may be configured to send an uplink channel during access, and may be configured to receive a downlink channel during access. Correspondences between various possible information sent and/or received by the sending module/receiving module 15001 and the foregoing methods are detailed in the foregoing methods, and details are not described herein again.

The apparatus 1500 may further include a determining module 15002. The determining module 15002 may be coupled to other module(s) included in the apparatus 1500. For example, the other module(s) includes at least one of the sending module/receiving module 15001 or a timing module 15003. When the apparatus 1500 is configured to implement or configured to support the UE in implementing the foregoing methods, the determining module 15002 may be configured to determine at least one of the first UE specific information, the second UE specific information, the first request, the feedback, the second request, the third request, or information carried by the uplink channel during access that are sent by the sending module/receiving module 15001. Correspondences between various possible information determined by the determining module 15002 and the foregoing methods are detailed in the foregoing methods, and details are not described herein again.

The apparatus 1500 may further include the timing module 15003. When the apparatus 1500 is configured to perform or configured to support the UE in performing the second bandwidth resource configuration method in FIG. 6, the timing module 15003 may be configured to perform a function of a first timer. When the apparatus 1500 is configured to perform or configured to support the UE in performing the third bandwidth resource configuration method in FIG. 8, the timing module 15003 may be configured to perform a function of a third timer. When the apparatus 1500 is configured to perform or configured to support the UE in performing the first access method in FIG. 12, the timing module 15003 may be configured to perform a function of a fourth timer. The timing module 15003 may be coupled to other module(s) included in the apparatus

1500. For example, the other module(s) includes at least one of the sending module/receiving module 15001 or the determining module 15002.

Figure 16:
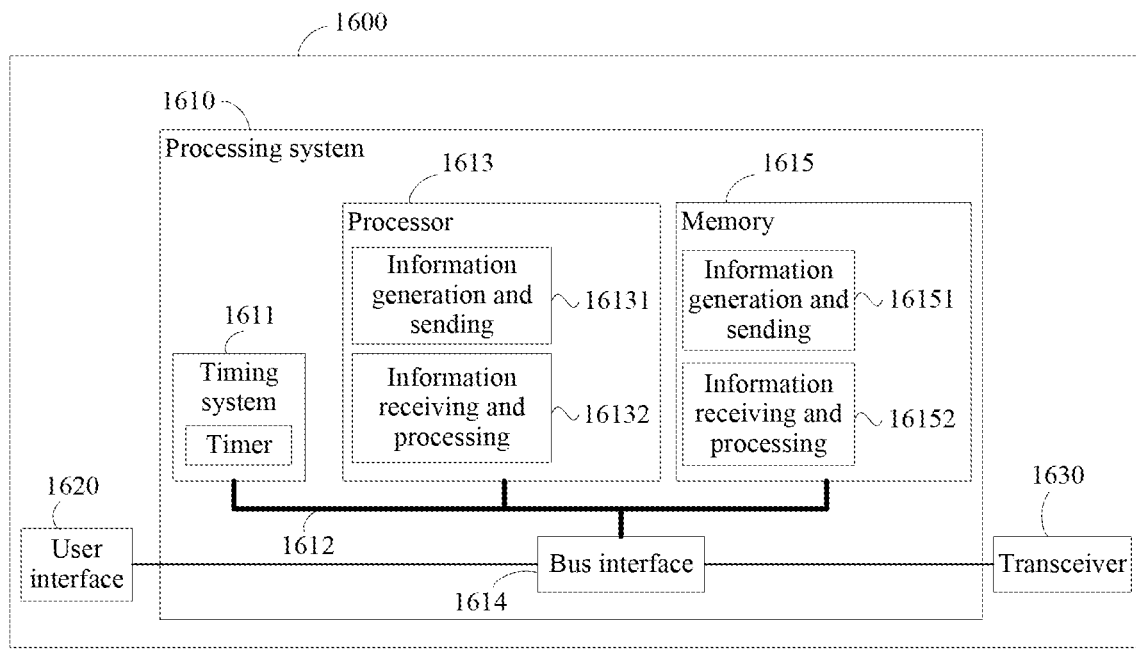
FIG. 16 is a schematic structural diagram of still another apparatus according to an embodiment of this application.

FIG. 16 is a schematic structural diagram of an apparatus 1600 according to an embodiment of this application. The apparatus 1600 may be a gNB, or may be an apparatus applied to a gNB. When applied to the gNB, the apparatus can support the gNB in performing gNB functions described in the foregoing methods.

As shown in FIG. 16, the apparatus 1600 includes a processing system 1610, configured to perform or configured to support the gNB in performing the gNB functions described in the foregoing methods. The processing system 1610 may be a circuit, and the circuit may be implemented by a chip system. The processing system 1610 includes at least one processor 1613. The processor 1613 may be configured to perform or configured to support the gNB in performing the gNB functions described in the foregoing methods. When the processing system 1610 includes other apparatus, the processor 1613 may be further configured to manage the other apparatus included in the processing system 1610. For example, the other apparatus may be at least one of a memory 1615, a timing system 1611, a bus 1612, or a bus interface 1614 described below. In the embodiments of this application, the processor may be a central processing unit (CPU), a general purpose processor, a network processor (NP), a digital signal processor (DSP), a microprocessor, a microcontroller, a programmable logic device (PLD), or any combination thereof.

The processing system 1610 may further include the memory 1615, configured to store a program instruction, or a program instruction and data. In the embodiments of this application, the memory includes a volatile memory, for example, a random-access memory (RAM); or the memory may include a non-volatile memory, for example, a flash memory, a hard disk drive (HDD), or a solid-state drive (SSD); or the memory may include a combination of the foregoing types of memories.

The processor 1613 may cooperate with the memory 1615. The processor 1613 may execute the program instruction stored in the memory 1615. When the processor 1613 executes the program instruction stored in the memory 1615, the processor 1613 may perform or support the gNB in performing at least one of the gNB functions in the foregoing methods. The processor 1613 may further read the data stored in the memory 1615. The memory 1615 may further store data obtained when the processor 1613 executes the program instruction.

The processor 1613 may include an information generation and sending circuit 16131. When the apparatus 1600 is configured to perform or configured to support the gNB in performing the foregoing methods, the information generation and sending circuit 16131 may be configured to generate and send first UE specific information, may be configured to generate and send second UE specific information, may be configured to generate and send frequency resource location information of a UE candidate operating bandwidth resource, may be configured to generate and send a configuration of a first period and a configuration of N2 first time units in the first period, may be configured to generate and send a first response, may be configured to generate and send a second response, and may be configured to generate and send information carried by a downlink channel during access. Correspondences between various possible information generated and sent by the information generation and sending circuit 16131 and the foregoing methods are detailed in the foregoing methods, and details are not described herein again. The memory 1615 may further include an information generation and sending module 16151. When performing the foregoing generation and sending functions, the information generation and sending circuit 16131 may cooperate with the information generation and sending module 16151.

The processor 1613 may further include an information receiving and processing circuit 16132. When the apparatus 1600 is configured to perform or configured to support the gNB in performing the foregoing methods, the information receiving and processing circuit 16132 may be configured to receive and process first UE specific information, may be configured to receive and process second UE specific information, may be configured to receive and process a first request, may be configured to receive and process a feedback, may be configured to receive and process a second request, may be configured to receive and process a third request, and may be configured to receive and process information carried by an uplink channel during access. Correspondences between various possible information received and processed by the information receiving and processing circuit 16132 and the foregoing methods are detailed in the foregoing methods, and details are not described herein again. The memory 1615 may further include an information receiving and processing module 16152. When performing the foregoing receiving and processing functions, the information receiving and processing circuit 16132 may cooperate with the information receiving and processing module 16152.

The processing system 1610 may further include the timing system 1611. When the apparatus 1600 is configured to perform or configured to support the gNB in performing the fourth bandwidth resource configuration method, the timing system 1611 may be configured to perform a function of a second timer.

The processing system 1610 may further include the bus interface 1614, configured to provide an interface between the bus 1612 and other apparatus.

The apparatus 1600 may further include a transceiver 1630, configured to communicate with other communication device by a transmission medium, so that other apparatus in the apparatus 1600 can communicate with the other communication device. The other apparatus may be the processing system 1610. For example, the other apparatus in the apparatus 1600 may communicate with the other communications device by using the transceiver 1630, to receive and/or send corresponding information. It may also be described as that, the other apparatus in the apparatus 1600 may receive corresponding information, and the corresponding information is received by the transceiver 1630 by the transmission medium, and the corresponding information may be exchanged between the transceiver 1630 and the other apparatus in the apparatus 1600 by using the bus interface 1614 or by using the bus interface 1614 and the bus 1612; and/or the other apparatus in the apparatus 1600 may send corresponding information, where the corresponding information is sent by the transceiver 1630 by the transmission medium, and the corresponding information may be exchanged between the transceiver 1630 and the other apparatus in the apparatus 1600 by using the bus interface 1614 or by using the bus interface 1614 and the bus 1612.

The apparatus 1600 may further include a user interface 1620. The user interface 1620 is an interface between a user and the apparatus 1600, and may be configured for information exchange between the user and the apparatus 1600.

For example, the user interface 1620 may be at least one of a keyboard, a mouse, a display, a speaker (speaker), a microphone, or a joystick.

An apparatus structure provided in an embodiment of this application is mainly described above from a perspective of the apparatus 1600. In the apparatus, the processing system 1610 includes the processor 1613, and may further include at least one of the memory 1615, the timing system 1611, the bus 1612, or the bus interface 1614, to implement the gNB functions described in the foregoing methods. The processing system 1610 also falls within the protection scope of this application.

Figure 17:
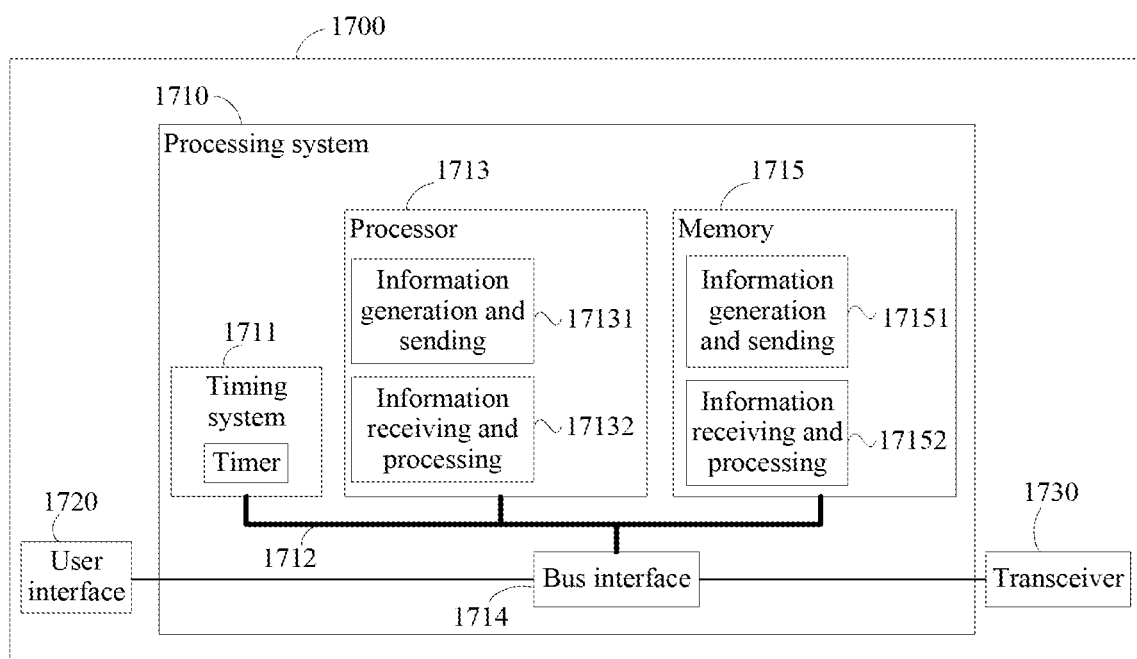
FIG. 17 is a schematic structural diagram of yet another apparatus according to an embodiment of this application.

FIG. 17 is a schematic structural diagram of an apparatus 1700 according to an embodiment of this application. The apparatus 1700 may be UE, or may be an apparatus applied to UE. When applied to the UE, the apparatus can support the UE in performing the functions of the UE that are described in the foregoing methods.

As shown in FIG. 17, the apparatus 1700 includes a processing system 1710, configured to perform or configured to support the UE in performing the functions of the UE that are described in the foregoing methods. The processing system 1710 may be a circuit, and the circuit may be implemented by a chip system. The processing system 1710 may include at least one processor 1713. The processor 1713 may be configured to perform or configured to support the UE in performing the functions of the UE that are described in the foregoing methods. When the processing system 1710 includes other apparatus, the processor 1713 may be further configured to manage the other apparatus included in the processing system 1710. For example, the other apparatus may be at least one of a memory 1715, a timing system 1711, a bus 1712, or a bus interface 1714 described below.

The processing system 1710 may further include the memory 1715, configured to store a program instruction, or a program instruction and data.

The processor 1713 may cooperate with the memory 1715. The processor 1713 may execute the program instruction stored in the memory 1715. When the processor 1713 executes the program instruction stored in the memory 1715, the processor 1713 may perform or support the UE in performing at least one of the functions of the UE in the foregoing methods. The processor 1713 may further read the data stored in the memory 1715. The memory 1715 may further store data obtained when the processor 1713 executes the program instruction.

The processor 1713 may include an information generation and sending circuit 17131. When the apparatus 1700 is configured to perform or configured to support the UE in performing the foregoing methods, the information generation and sending circuit 17131 may be configured to generate and send first UE specific information, may be configured to generate and send second UE specific information, may be configured to generate and send a first request, may be configured to generate and send a feedback, may be configured to generate and send a second request, may be configured to generate and send a third request, and may be configured to generate and send information carried by an uplink channel during access. Correspondences between various possible information generated and sent by the information generation and sending circuit 17131 and the foregoing methods are detailed in the foregoing methods, and details are not described herein again. The memory 1715 may further include an information generation and sending module 17151. When performing the foregoing generation and sending functions, the information generation and sending circuit 17131 may cooperate with the information generation and sending module 17151.

The processor 1713 may further include an information receiving and processing circuit 17132. When the apparatus 1700 is configured to perform or configured to support the UE in performing the foregoing methods, the information receiving and processing circuit 17132 may be configured to receive and process first UE specific information, may be configured to receive and process second UE specific information, may be configured to receive and process a first response, may be configured to receive and process a second response, and may be configured to receive and process information carried by a downlink channel during access. Correspondences between various possible information received and processed by the information receiving and processing circuit 17132 and the foregoing methods are detailed in the foregoing methods, and details are not described herein again. The memory 1715 may further include an information receiving and processing module 17152. When performing the foregoing receiving and processing functions, the information receiving and processing circuit 17132 may cooperate with the information receiving and processing module 17152.

The processing system 1710 may further include the timing system 1711. When the apparatus 1700 is configured to perform or configured to support the UE in performing the second bandwidth resource configuration method in FIG. 6, the timing system 1711 may be configured to perform a function of a first timer. When the apparatus 1700 is configured to perform or configured to support the UE in performing the third bandwidth resource configuration method in FIG. 8, the timing system 1711 may be configured to perform a function of a third timer. When the apparatus 1700 is configured to perform or configured to support the UE in performing the first access method in FIG. 12, the timing system 1711 may be configured to perform a function of a fourth timer.

The processing system 1710 may further include the bus interface 1714, configured to provide an interface between the bus 1712 and other apparatus.

The apparatus 1700 may further include a transceiver 1730, configured to communicate with other communication device by a transmission medium, so that other apparatus in the apparatus 1700 can communicate with the other communication device. The other apparatus may be the processing system 1710. For example, the other apparatus in the apparatus 1700 may communicate with the other communications device by using the transceiver 1730, to receive and/or send corresponding information. It may also be described as that, the other apparatus in the apparatus 1700 may receive corresponding information, and the corresponding information is received by the transceiver 1730 by the transmission medium, and the corresponding information may be exchanged between the transceiver 1730 and the other apparatus in the apparatus 1700 by the bus interface 1714 or by using the bus interface 1714 and the bus 1712; and/or the other apparatus in the apparatus 1700 may send corresponding information, where the corresponding information is sent by the transceiver 1730 by the transmission medium, and the corresponding information may be exchanged between the transceiver 1730 and the other apparatus in the apparatus 1700 by using the bus interface 1714 or by using the bus interface 1714 and the bus 1712. In the embodiments of this application, the transceiver may be referred to as a transmitter/receiver.

The apparatus 1700 may further include a user interface 1720. The user interface 1720 is an interface between a user and the apparatus 1700, and may be configured for information exchange between the user and the apparatus 1700. For example, the user interface 1720 may be at least one of a keyboard, a mouse, a display, a speaker (speaker), a microphone, or a joystick.

An apparatus structure provided in an embodiment of this application is mainly described above from a perspective of the apparatus 1700. In the apparatus, the processing system 1710 includes the processor 1713, and may further include at least one of the memory 1715, the timing system 1711, the bus 1712, or the bus interface 1714, to perform the functions of the UE that are described in the foregoing methods. The processing system 1710 also falls within the protection scope of this application.

In the apparatus embodiments of this application, the module division of the apparatus is logical function division, and may be other division in actual implementation. For example, functional modules of the apparatus may be integrated into one module, or each of the functional modules may exist alone, or two or more functional modules may be integrated into one module.

All or some of the methods described in the embodiments of this application may be performed by software, hardware, firmware, or any combination thereof. When performed by software, all or some of the methods may be performed in a form of a computer program product. The computer program product includes one or more computer instructions. When the computer program instructions are loaded and executed on a computer, all or some of the procedures or functions according to the embodiments of the present invention are generated. The computer may be a general purpose computer, a dedicated computer, a computer network, a network device, user equipment, or other programmable apparatus. The computer instruction may be stored in a computer-readable storage medium or may be transmitted from one computer-readable storage medium to other computer-readable storage medium. For example, the computer instruction may be transmitted from one website, computer, server, or data center to other website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, including one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

In this document, the terms "a" or "an" are used to include one or more. Reference to an element in a singular is intended to mean "one or more" and not to mean "one and only one" unless specifically stated. The foregoing embodiments are intended only for describing the technical solutions of this application, but not for limiting the protection scope of this application. Any modification, equivalent substitution, improvement, and the like made based on the technical solutions of this application shall fall within the protection scope of this application.

What is claimed is:

1. A method, comprising:
    transmitting a first control channel and a first data channel to a terminal in a first bandwidth part;
    starting or restarting a first timer in response to transmitting a first physical downlink control channel (PDCCH) to the terminal in the first bandwidth part, the first control channel comprising the first PDCCH;
    in response to the first timer expiring, transmitting information about a second bandwidth part to the terminal in a third bandwidth part, wherein the second bandwidth part is a bandwidth part to be switched to by the terminal, and wherein:
        the third bandwidth part is an access bandwidth part; or
        the third bandwidth part is comprised in one or more candidate operating bandwidth parts of the terminal; and
    transmitting a second control channel and a second data channel to the terminal in the second bandwidth part.

2. The method according to claim 1, wherein the first bandwidth part is different from the third bandwidth part.

3. The method according to claim 1, wherein transmitting the information about the second bandwidth part to the terminal in the third bandwidth part comprises:
    transmitting a second PDCCH to the terminal in the third bandwidth part, wherein the second PDCCH carries the information about the second bandwidth part.

4. The method according to claim 1, further comprising:
    transmitting the information about the second bandwidth part to the terminal in the first bandwidth part.

5. The method according to claim 1, wherein the first PDCCH is transmitted in a specific search space.

6. The method according to claim 1, further comprising:
    transmitting frequency resource location information of the one or more candidate operating bandwidth parts to the terminal, wherein the second bandwidth part is comprised in the one or more candidate operating bandwidth parts.

7. The method according to claim 1, wherein transmitting the information about the second bandwidth part to the terminal in the third bandwidth part comprises:
    transmitting the information about the second bandwidth part to the terminal in the third bandwidth part periodically.

8. The method according to claim 1, wherein transmitting the information about the second bandwidth part to the terminal in the third bandwidth part comprises:
    transmitting the information about the second bandwidth part to the terminal in the third bandwidth part in response to an access of the terminal.

9. An apparatus, comprising:
    a non-transitory memory;
    at least one processor coupled to the memory, wherein the at least one processor is configured to execute a program stored in the memory to:
        transmit a first control channel and a first data channel to a terminal in a first bandwidth part;
        start or restart a first timer in response to transmitting a first physical downlink control channel (PDCCH) to the terminal in the first bandwidth part, the first control channel comprising the first PDCCH;
        in response to the first timer expiring, transmit information about a second bandwidth part to the terminal in a third bandwidth part, wherein the second bandwidth part is a bandwidth part to be switched to by the terminal, and wherein:
            the third bandwidth part is an access bandwidth part; or
            the third bandwidth part is comprised in one or more candidate operating bandwidth parts of the terminal; and
        transmit a second control channel and a second data channel to the terminal in the second bandwidth part.

10. The apparatus according to claim 9, wherein the first bandwidth part is different from the third bandwidth part.

11. The apparatus according to claim 9, wherein the at least one processor being configured to execute the program stored in the memory to transmit the information about the second bandwidth part to the terminal in the third bandwidth part comprises the at least one processor being configured to execute the program stored in the memory to:
    transmit a second PDCCH to the terminal in the third bandwidth part, wherein the second PDCCH carries the information about the second bandwidth part.

12. The apparatus according to claim 9, wherein the at least one processor is further configured to execute the program stored in the memory to:
    transmit frequency resource location information of the one or more candidate operating bandwidth parts to the terminal, wherein the second bandwidth part is comprised in the one or more candidate operating bandwidth parts.

13. The apparatus according to claim 9, further comprising:
    a transceiver;
    wherein the at least one processor is configured to utilize the transceiver to communicate with the terminal.

14. A non-transitory computer-readable storage medium storing program instructions, wherein the program instructions are configured to be executed by a processor of an apparatus to cause the apparatus to:
    transmit a first control channel and a first data channel to a terminal in a first bandwidth part;
    start or restart a first timer in response to transmitting a first physical downlink control channel (PDCCH) to the terminal in the first bandwidth part, the first control channel comprising the PDCCH;
    in response to the first timer expiring, transmit information about a second bandwidth part to the terminal in a third bandwidth part, wherein the second bandwidth part is a bandwidth part to be switched to by the terminal, and wherein:
        the third bandwidth part is an access bandwidth part; or
        the third bandwidth part is comprised in one or more candidate operating bandwidth parts of the terminal; and
    transmit a second control channel and a second data channel to the terminal in the second bandwidth part.

15. The non-transitory computer-readable storage medium according to claim 14, wherein the first bandwidth part is different from the third bandwidth part.

16. The non-transitory computer-readable storage medium according to claim 14, wherein transmitting the information about the second bandwidth part to the terminal in the third bandwidth part comprises:
    transmitting a second PDCCH to the terminal in the third bandwidth part, wherein the second PDCCH carries the information about the second bandwidth part.

17. The non-transitory computer-readable storage medium according to claim 14, wherein the program instructions are configured to be further executed by the processor to cause the apparatus to:
    transmit frequency resource location information of the one or more candidate operating bandwidth parts to the terminal, wherein the second bandwidth part is comprised in the one or more candidate operating bandwidth parts.

18. The apparatus according to claim 9, wherein the at least one processor is further configured to execute the program stored in the memory to:
    transmit the information about the second bandwidth part to the terminal in the first bandwidth part.

19. The apparatus according to claim 9, wherein the first PDCCH is transmitted in a specific search space.

20. The non-transitory computer-readable storage medium according to claim 14, wherein the first PDCCH is transmitted in a specific search space.

* * * * *